(12) United States Patent
Ballow et al.

(10) Patent No.: US 7,899,735 B2
(45) Date of Patent: Mar. 1, 2011

(54) TOTAL RETURN TO SHAREHOLDERS TARGET SETTING

(75) Inventors: John J. Ballow, Eatons Neck, NY (US); Brian F. McCarthy, Altanta, GA (US); Anthony J. Relvas, Ladera Ranch, CA (US); Roland Burgman, New York, NY (US)

(73) Assignee: Accenture Global Services Limited (IE)

(*) Notice: Subject to any disclaimer, the term of this patent is extended or adjusted under 35 U.S.C. 154(b) by 1295 days.

(21) Appl. No.: 11/072,566

(22) Filed: Mar. 2, 2005

(65) Prior Publication Data
US 2005/0209944 A1    Sep. 22, 2005

Related U.S. Application Data

(60) Provisional application No. 60/549,619, filed on Mar. 2, 2004.

(51) Int. Cl.
*G06Q 40/00* (2006.01)
(52) U.S. Cl. ......................................................... 705/37
(58) Field of Classification Search .................... 705/35, 705/36 R, 37
See application file for complete search history.

(56) References Cited

U.S. PATENT DOCUMENTS

| | | | |
|---|---|---|---|
| 6,154,731 A | 11/2000 | Monks et al. | |
| 6,928,418 B2* | 8/2005 | Michaud et al. | 705/36 R |
| 2002/0013720 A1 | 1/2002 | Ozono et al. | 705/7 |
| 2002/0133441 A1* | 9/2002 | Tanaka | 705/35 |
| 2003/0023533 A1* | 1/2003 | Tan | 705/36 |
| 2003/0046203 A1 | 3/2003 | Ichihari et al. | |
| 2003/0065605 A1* | 4/2003 | Gatto | 705/36 |
| 2003/0105695 A1 | 6/2003 | Ikeda et al. | |
| 2004/0039676 A1* | 2/2004 | Trainer | 705/36 |
| 2004/0064331 A1 | 4/2004 | Mayer et al. | |
| 2004/0073441 A1 | 4/2004 | Heyns et al. | |
| 2004/0073477 A1 | 4/2004 | Heyns et al. | |
| 2004/0215495 A1 | 10/2004 | Eder | |
| 2004/0249731 A1 | 12/2004 | Sonnek et al. | |
| 2005/0004832 A1 | 1/2005 | Ostergard et al. | |
| 2005/0144096 A1 | 6/2005 | Caramanna, II et al. | |
| 2005/0209942 A1 | 9/2005 | Ballow et al. | |
| 2005/0209943 A1 | 9/2005 | Ballow et al. | |
| 2005/0209944 A1 | 9/2005 | Ballow et al. | |
| 2005/0209945 A1 | 9/2005 | Ballow et al. | |
| 2005/0209946 A1 | 9/2005 | Ballow et al. | |
| 2006/0190367 A1 | 8/2006 | Lepman | |

OTHER PUBLICATIONS

Non-final Office Action from copending U.S. Appl. No. 11/072,895 dated Jul. 5, 2007.
Alexa Michl et al., The CFO Project, Competitive Financial Operations, "Watching Goodwill Go Bad"; 14 pages, Oct. 1, 2003; info@mriresearch.com.
Wlodek Zadrozny, IBM Research Report, "*Text Analytics for Asset Valuation*", IBM Research Division, Thomas J. Watson Research Center, Aug. 27, 2004, Computer Science.

(Continued)

*Primary Examiner* — Thu-Thao Havan
*Assistant Examiner* — Greg Pollock
(74) *Attorney, Agent, or Firm* — Brinks Hofer Gilson & Lione

(57) ABSTRACT

A computer-implemented method for setting targets of predicted growth of financial metrics of a company is provided. The method may include displaying a template of historical and predicted financial performance measures, receiving inputs of predicted financial targets such as earnings growth and shareholder return, and calculating the predicted future value and current value components required to obtain the financial targets.

9 Claims, 13 Drawing Sheets

OTHER PUBLICATIONS

John J. Ballow et al., Blackwell Synergy, *"Future Value: The $7 Trillion Challenge"* Journal of Applied Corporate Finance, vol. 16, Issue 1, p. 71, Winter 2004.

John Ballow, et al., A New Paradigm for Managing Shareholder Value, Accenture Institute for High Performance Business, Jul. 2004; 24 pages.

John J. Ballow, et al., Accenture Institute for High Performance Business, *"New Concepts in Value-Based Management"*, TRS Mapping and Total Economic Profit, Research Note, Intangible Assests and Future Value, Issue Two, May 10, 2004.

John J. Ballow et al., *"Enhanced Business Reporting"*, A formal joint proposal to the AICPA from Accenture LLP & AssetEconomics, Inc., Oct. 2004.

John J. Ballow et al., *"Managing for shareholder value: intangibles, future value and investment decisions"*, Journal of Business Strategy, vol. 25, No. 3, 2004, printed from website www.ingentaconnec.com/content/mcb, 2 pages, Jan. 29, 2007.

Esa Mäkeläinen, Universitas Oeconomica Helsingiensis, *"Econmic Value Added as a management tool"*, Sep. 9, 1998, 49 pages; http://www.evanomics.com/evastudy.shtml.

Brian F. McCarthy, *"Instant gratification or long-term value? A lesson in enhancing shareholder wealth"*, Journal of Business Strategy, vol. 25, No. 4, 2004, printed from website http://ingentaconnect.com/content/mcb, 2 pages, Jan. 29, 2007.

United States Patent and Trademark Notice of Allowability dated Mar. 5, 2008 for copending U.S. Appl. No. 11/072,895.

United States Patent and Trademark Office Action mailed Nov. 10, 2009 for co-pending U.S. Appl. No. 11/072,567.

United States Patent and Trademark Office Action mailed Jan. 5, 2010 for co-pending U.S. Appl. No. 11/072,351.

* cited by examiner

Total Return to Shareholders Statement

Assumptions

| Target Input Variables | | |
|---|---|---|
| NOPLAT Growth | 10.00% | Targeted growth rate determined by planning process |
| Terminal Growth (GDP) | 3.50% | GDP terminal growth based on historical analysis-US Dept of Commerce |
| WACC | 9.06% | WACC represents the minimum return that must be generated |
| TRS | 10.00% | Targeted return to shareholders; minimum % = WACC |
| Dividends Per Share | $ 0.80 | Dividend payout reduces invested capital = capital returned to shareholders |

| | Historical Performance | | | Target | Target Setting Analysis | | |
|---|---|---|---|---|---|---|---|
| Current Value | 2001 | 2002 | 2003 | Target | Variance | Adj Target | Variance |
| Revenue | 10,744 | 11,596 | 13,181 | | 13,181 | 13,181 | 13,181 |
| - COGS (w/o Dep & Amort) | (7,924) | (8,388) | (9,186) | | (9,186) | (9,186) | (9,186) |
| + Operating Lease Expense | 333 | 443 | 499 | | 499 | 499 | 499 |
| - SG&A | (2,045) | (2,259) | (2,816) | | (2,816) | (2,816) | (2,816) |
| - Other Operating Expenses | | | - | | - | - | - |
| - Depreciation & Amortization Expense | (249) | (267) | (283) | | (283) | (283) | (283) |
| Adjusted EBIT | 859 | 1,126 | 1,395 | | 1,395 | 1,395 | 1,395 |
| + Amortization Expense | | 2 | 8 | | 8 | 8 | 8 |
| EBITA | 859 | 1,128 | 1,403 | | 1,403 | 1,403 | 1,403 |
| Marginal Taxes on EBITA | (318) | (417) | (519) | | (519) | (519) | (519) |
| NOPLAT | 541 | 711 | 884 | 782 | 102 | 884 | 884 |
| + Operating Cash | 215 | 232 | 264 | | 264 | 264 | 264 |
| + Accounts Receivables | 339 | 364 | 410 | | 410 | 410 | 410 |
| + Inventory | 1,460 | 1,555 | 1,466 | | 1,466 | 1,466 | 1,466 |
| + Other Current Assets | 210 | 202 | 211 | | 211 | 211 | 211 |
| Operating Current Assets | 2,223 | 2,353 | 2,351 | | 2,351 | 2,351 | 2,351 |
| - Accounts Payable | (935) | (1,092) | (1,111) | | (1,111) | (1,111) | (1,111) |
| - Income Taxes Payable | (212) | (190) | (207) | | (207) | (207) | (207) |
| - Other Current Liabilities | (443) | (566) | (615) | | (615) | (615) | (615) |
| Non-Interest bearing Current Liabilities | (1,591) | (1,848) | (1,933) | | (1,933) | (1,933) | (1,933) |
| + Operating Working Capital | 632 | 506 | 418 | | 418 | 418 | 418 |
| + Net PPE | 1,359 | 1,448 | 1,505 | | 1,505 | 1,505 | 1,505 |
| + Implied Value of Operating Leases | 6,559 | 8,229 | 8,426 | | 8,426 | 8,426 | 8,426 |
| + Other Operating Assets | 106 | 348 | 317 | | 317 | 317 | 317 |
| - Other Operating Liabilities | (86) | (105) | (142) | | (142) | (142) | (142) |
| Invested Capital w/o Goodwill | 8,570 | 10,426 | 10,524 | | 10,524 | 10,524 | 10,524 |
| + Net Goodwill | 780 | 1,757 | 1,752 | | 1,752 | 1,752 | 1,752 |
| Invested Capital w/ Goodwill | 9,350 | 12,184 | 12,276 | 12,587 | (311) | 12,276 | 12,276 |
| Current Value | 5,239 | 7,846 | 9,974 | 8,631 | (1,343) | 9,974 | 9,974 |
| Operating Advantage | | | | | | | |
| Financing | | | | | | | |
| Risk Free Rate | 5.03% | 3.96% | 4.33% | 3.96% | 0.37% | 4.33% | 4.33% |
| Market Risk Premium | 5.00% | 5.00% | 5.00% | 5.00% | - | 5.00% | 5.00% |
| Beta | 2 | 2 | 2 | 2 | (1) | 1.61 | 1.61 |
| Ke (Cost of Equity) | 15.33% | 15.36% | 12.38% | 15.36% | -2.98% | 12.38% | 12.38% |
| Kd | 6.69% | 5.62% | 5.99% | 5.62% | 0.37% | 5.99% | 5.99% |
| Tax Rate | 37.0% | 37.0% | 37.0% | 37.0% | - | 37.00% | 37.00% |
| Market Capitalization | 8,454 | 8,123 | 13,284 | 8,557 | 4,726 | 13,284 | 13,284 |
| Total Debt | 6,914 | 9,289 | 9,184 | 10,218 | (1,034) | 9,184 | 9,184 |
| Total Market Value | 15,368 | 17,412 | 22,467 | 18,775 | 3,692 | 22,467 | 22,467 |
| WACC (Weighted Average Cost of Capital) | 10.33% | 9.06% | 8.86% | 9.06% | -0.19% | 8.86% | 8.86% |
| Δ in CV due to Tax Rate Δ | | | | | | | |
| Δ in CV due to Capital Structure Δ (WACC) | | 969 | 212 | 785 | 212 | 212 | 212 |
| Δ in CV due to Operations | | 1,639 | 1,916 | | 1,131 | | 1,916 |
| Change in Current Value Check | | | | (0) | 0 | | |

Fig. 5A

| | Historical Performance | | Target Setting Analysis | |
|---|---:|---:|---:|---:|
| Enterprise Value | | | | |
| Enterprise Value | 15,368 | 17,412 | 22,467 | 18,775 | 22,467 |
| Market Value Added | 6,018 | 5,229 | 10,192 | 6,188 | 10,192 |
| Capital Charge | 966 | 1,103 | 1,088 | 1,140 | 1,088 |
| Economic Profit ($) | (425) | (393) | (204) | (358) | (204) |
| Return on Invested Capital (%) | 5.79% | 5.83% | 7.20% | 6.21% | 7.20% |
| Future Value | | | | |
| Future Value (Economic View displayed) | 10,129 | 9,566 | 12,493 | 10,144 | 12,493 |
| Operating Disadvantage | 6,218 | 7,069 | 3,803 | 6,448 | 3,803 |
| Expected Growth at GDP (as illustrative idex) | 2,684 | 4,942 | 6,508 | 5,436 | 6,508 |
| Future Value Premium (FV') | 1,228 | (2,446) | 2,182 | (1,740) | 2,182 |
| Market Benchmark Index Value (S&P 500) | 1,130 | 856 | 1,131 | 886 | 1,131 |
| Market Benchmark % Return (S&P 500) | | -24.29% | 32.19% | 3.50% | 32.19% |
| Future Value Indexed (FV') | | 11,358 | 12,295 | 10,402 | 12,295 |
| Adjusted Future Value of EP (FV¹ * WACC) | 1,047 | 1,029 | 1,090 | 942 | 1,090 |
| EP + (EP + Adjusted Future Value of RONA) | 38 | 636 | 886 | 584 | 886 |
| Total Economic Profit | | | | |
| Economic Profit | (425) | (393) | (204) | (358) | (204) |
| Invested Capital Charge | 966 | 1,103 | 1,088 | 1,140 | |
| Economic Profit of Future Value (EPFV) | 1,047 | 866 | 1,107 | 919 | 1,107 |
| EP Finance (Dividends,WACC,D/E) | 38 | | | 34 | |
| Total Economic Profit $ | 1,626 | 1,577 | 1,991 | 1,735 | 1,991 |
| Total Economic Profit % | | -3.03% | 26.29% | 10.00% | 26.29% |
| Total Return to Shareholders | | | | |
| Common Shares Outstanding | 464 | 473 | 499 | 473 | 499 |
| Share Price | 18.22 | 17.17 | 26.61 | 18 | 27 |
| Dividends Paid per share | 1 | | | 0.80 | |
| TRS ($) attributable to Share Price | | (331) | 5,160 | (3,397) | (1) |
| TRS ($) attributable to Dividends | | | | 378 | |
| TRS ($) | 8,825 | 8,123 | 13,284 | 8,557 | 13,284 |
| TRS ($) Indexed | | 9,450 | 17,446 | 4,348 | 17,446 |
| TRS (%) Return attributable to Share Price Δ | | -5.76% | 54.98% | 49.64% | 54.98% |
| TRS (%) Return attributable to Dividends | | | | 5.34% | |
| TRS (%) | | -5.76% | 54.98% | 4.66% | 54.98% |
| TRS (%) Indexed | | 18.52% | 22.79% | 10.00% | 44.98% |
| | | | | 6.50% | 22.79% |

Fig. 5B

| 2003 | 2004 | 2005 | 2006 | 2007 | |
|---|---|---|---|---|---|
| TRS% ||||| |
| 1.00 | 1.10 | 1.21 | 1.33 | 1.46 | —610 |
| TRS $ (EQUITY + DIVIDENDS) ||||| |
| $3,200 | $3,520 | $3,872 | $4,259 | $4,685 | —612 |
| DIVIDENDS ||||| |
| $200 | $210 | $221 | $232 | $243 | —614 |
| EQUITY (MV) ||||| |
| $3,000 | $3,310 | $3,652 | $4,028 | $4,442 | —616 |
| DEBT ||||| |
| $2,000 | $2,207 | $2,434 | $2,685 | $2,961 | —618 |
| ENTERPRISE VALUE (EV) ||||| |
| $5,000 | $5,517 | $6,086 | $6,713 | $7,403 | —620 |
| ECONOMIC PROFIT OF CURRENT VALUE (EP OF CV) ||||| |
| $750 | $825 | $908 | $998 | $1,098 | —622 |
| FUTURE VALUE (FV) ||||| |
| $4,250 | $4,692 | $5,175 | $5,715 | $6,305 | —624 |
| ECONOMIC PROFIT ||||| |
| $75 | $83 | $91 | $100 | $110 | —626 |
| ECONOMIC PROFIT OF FUTURE VALUE (EP OF FV) ||||| |
| $425 | $469 | $518 | $571 | $631 | —628 |
| TOTAL ECONOMIC PROFIT ||||| |
| $500 | $552 | $609 | $671 | $740 | —630 |
| ANNUAL TRS $ CHANGE ||||| |
| | $520 | $562 | $608 | $657 | —632 |

GROWTH 10% —602

DIVIDEND % 5% —604

DEBT/EQUITY % 40% —606

Annual TRS $ Change = (TEP2 - TEP1)/WACC - Change in Debt + Dividends
Where TEP2 represents Total Economic Profit at end of period and TEP1 represents Total Economic Profit at beginning of period and assume WACC is constant over time

Fig. 6

TOTAL RETURN TO SHAREHOLDERS TARGET SETTING

RELATED APPLICATIONS

The present patent document claims the benefit of the filing date under 35 U.S.C. §119(e) of Provisional U.S. Patent Application Ser. No. 60/549,619, filed Mar. 2, 2004, which is hereby incorporated by reference. This application is related to U.S. application Ser. No. 11/072,351 filed Mar. 2, 2005, U.S. application Ser. No. 11/072,354 filed Mar. 2, 2005, U.S. application Ser. No. 11/072,565 filed Mar. 2, 2005, U.S. application Ser. No. 11/072,567 filed Mar. 2, 2005, and U.S. application Ser. No. 11/072,895 filed Mar. 2, 2005.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to any software and data as described below and in the drawings hereto: Copyright© 2005, Accenture, All Rights Reserved.

BACKGROUND

1. Technical Field

The present invention relates generally to business performance management, and more particularly to a system and method for evaluating a company's performance based on the decomposition and mapping of total return to shareholders.

2. Background Information

Business performance management (BPM), also known as Enterprise performance management (EPM), relates to the execution and monitoring of the performance of various components of a company's business. BPM, sometimes referred to as the next generation of business intelligence (BI), focuses on business processes such as planning and forecasting and helps businesses discover efficient use of their business units, financial, human, and material resources. Typically, BPM systems consolidate data from various sources, and provide functions for querying and analyzing the data and putting the results into practice.

BPM enhances business processes by creating better feedback loops that allow for the continuous, real-time review of information to help identify and eliminate problems before they grow. For example, forecasting capabilities may help the company take corrective action in time to meet earnings projections. BPM may also be useful in risk analysis and predicting outcomes of merger and acquisition scenarios, as well as planning to overcome potential problems.

BPM provides key performance indicators (KPI), or performance metrics, that help companies monitor efficiency of projects and employees against operational targets. These metrics/KPI may be used to assess the present state of the business and to prescribe a course of action. For example, BPM systems have been used to analyze: New customers acquired; Status of existing customers; Attrition of customers; Turnover generated by segments of the Customers; Outstanding balances held by segments of customers and terms of payment; Collection of bad debts within customer relationships; Demographic analysis of individuals (potential customers) applying to become-customers, and the levels of approval, rejections and pending numbers; Delinquency analysis of customers behind on payments; and Profitability of customers by demographic segments and segmentation of customers by profitability. Regardless of the type of analysis a BPM system may be used for, BPM systems must acquire metric/KPI that is consistent, correct, and timely available.

Despite the great benefits many BPM systems provide, these systems are only as powerful as the metrics/KPI used to benchmark business performance. Unfortunately, there is a disconnect in traditional BPM systems between the financial performance metrics companies use in analyzing business performance and the ability to create and sustain high performance results in their execution over time. This disconnect arises because most companies take an internal approach to evaluating their business performance using performance metrics such as Earnings per Share (EPS), Return on Net Assets (RONA), Earnings Before Interest, Taxes, Depreciation, and Amortization (EBITDA), Return on Investment Capital (ROIC), Economic Value Added (EVA), Cash Flow Return on Investment (CFROI), and the like. These metrics neglect the true drivers of sustainable shareholder value and instead only determine the operating performance for the current operating year. Essentially, these metrics only provide analysis of a company's current value, or the present value of the uniform perpetual earnings on assets currently held by the company.

This disconnect becomes even more apparent when analyzing companies such as biotech companies with a high percentage of future value, or the present value of company opportunities for investments in real assets that will yield more than the normal market rate of return. For example, traditional value management focuses on Net Operating Profit Less Adjusted Taxes (NOPLAT) as the only source of "Return" on Invested Capital. Because high future value firms have little or no NOPLAT, there is no accounting for the value created by these types of companies.

Companies attempt to solve this disconnect through the implementation of major new transactional systems or point solutions to specific problems, such as ERP systems and data warehouses. Although these solutions are good at tracking transactional data, they do not help a company plan for what may occur and track the key drivers to enable decision making. Point solutions are band-aides that don't address the real problem of proactively managing those aspects of business performance that contribute to sustainable shareholder value.

Other companies address the current problems with BPM by implementing a Balanced Scorecard or Executive Dashboard. Exemplary scorecards and dashboards include the Cognos® Metrics Manager and Cognos® Visualizer, provided by Cognos, Inc. of Ottawa, Canada, and the Hyperion Performance Scorecard, provided by Hyperion Solutions Corporation of Sunnyvale, Calif. These solutions attempt to capture the financial and non-financial drivers of value for the company. These solutions typically provide results that are useful and insightful. However, these solutions may not be integrated into the remaining BPM systems utilized by the company, and may not incorporate metrics reflective of the true drivers of shareholder values.

Accordingly, there is a need for software tools and information technology solutions to create an integrated capability to drive BPM strategy and value creation that accurately measures the key drivers of both current and future value from an external perspective as well as detail how these drivers interrelate.

BRIEF SUMMARY

In one embodiment, a computer-implemented method for predicting financial performance measures of a company includes displaying on a computer user interface a financial performance template for displaying actual performance measures for a first time period, predicted performance measures for a second time period and a change in performance measures from the first time period to the second time period. The displayed financial performance measures include NOPAT, Capital, WACC, EP, Current Value (CV), Future Value (FV), Enterprise Value (EV), Market Value of Equity, Market Value of Debt, number of company shares, and share price. The computer receives the values for the first time period for the actual performance measures of NOPAT, Capital, WACC, EP, Market Value of Equity, Market Value of Debt, and either number of company shares or share price, and then calculates for the first time period the Enterprise Value, the Current Value and the Future Value based on the received performance measures. The computer also receives the values for the second time period for the target performance measures of Target TRS, Target Dividend per Share and Target NOPAT Growth and calculates for the second time period the predicted financial performance values based on the received actual performance measures and the target performance measures. The computer calculates and displays the change in the performance measures from the first period to the second period. Company business goals may be established based on predicted financial performance measures calculated for a received target performance measure.

In another embodiment, a computer-implemented method for analyzing financial performance measures of a company includes receiving into a computer historical financial data of a company for at least a first time period and a second time period, the first time period preceding the second time period; receiving target input variables for targeted changes from the first time period to the second time period, the target input variables comprising target NOPAT growth, and target Return to Shareholders; calculating with the computer the actual performance change from the first period to the second period; calculating with the computer the predicted financial data for the second period based on the target input variables applied to the historical financial data for the first period; comparing the predicted financial data of the second period with the historical financial data for the second period to determine a performance variance; and adjusting target input variables for a future time period based on the determined performance variance.

Optionally, the predicted financial performance or the determined performance variance may be used to establish an investment in a driver of a revenue component that defines an expected dollar amount of future sales, a costs component that defines an expected dollar amount of future costs, or a capital component that defines an expected future capital structure of the company to obtain the desired operational performance of the component to result in the predicted return to shareholders.

These and other embodiments and aspects of the invention are described with reference to the noted Figures and the below detailed description of the preferred embodiments.

BRIEF DESCRIPTION OF THE DRAWINGS

FIG. 5A is a diagram representative of a computer display of a first part of an exemplary calculation worksheet;

FIG. 5B is a diagram representative of a computer display of second part of an exemplary calculation of Total Economic Profit (TEP);

FIG. 6 is a diagram representative of an TRS calculation using the TEP performance metric;

DETAILED DESCRIPTION OF THE DRAWINGS AND THE PRESENTLY PREFERRED EMBODIMENTS

Figure 1A:
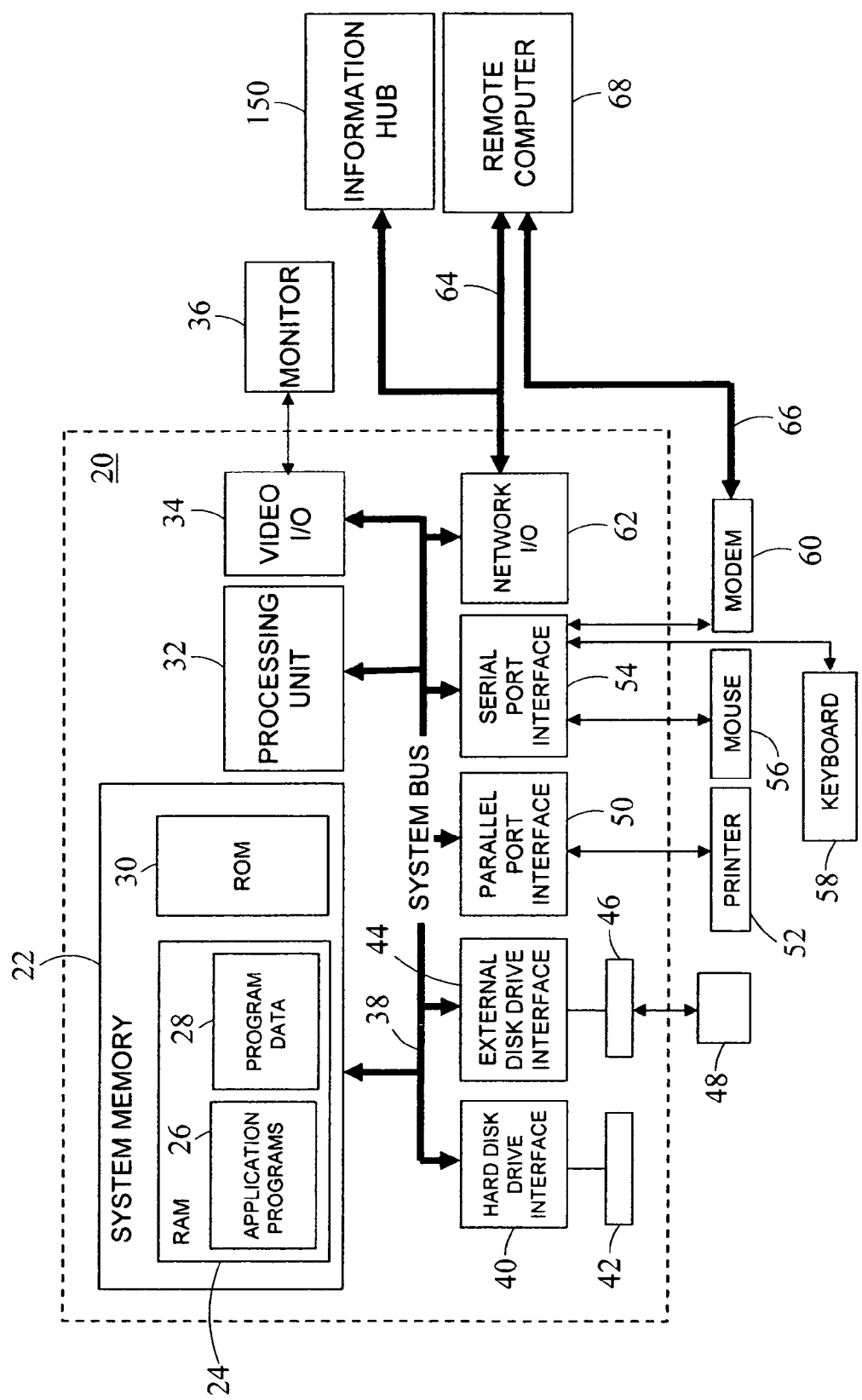
FIG. 1A is a diagram representative of an exemplary system for implementing one embodiment.

Referring now to the drawings, and initially to FIG. 1, an exemplary system for implementing the invention includes a general purpose computing device in the form of a computing environment 20, including a processing unit 32, a system memory 22, and a system bus 38, that couples various system components including the system memory 22 to the processing unit 32. The processing unit 32 may perform arithmetic, logic and/or control operations by accessing system memory 22. The system memory 22 may store information and/or instructions for use in combination with processing unit 32. The system memory 22 may include volatile and non-volatile memory, such as random access memory (RAM) 24 and read only memory (ROM) 30. A basic input/output system (BIOS) containing the basic routines that helps to transfer information between elements within the computer environment 20, such as during start-up, may be stored in ROM 30. The system bus 38 may be any of several types of bus structures including a memory bus or memory controller, a peripheral bus, and a local bus using any of a variety of bus architectures.

The computing environment 20 may further include a hard disk drive 42 for reading from and writing to a hard disk (not shown), and an external disk drive 46 for reading from or writing to a removable external disk 48. The removable disk may be a magnetic disk for a magnetic disk driver or an optical disk such as a CD ROM for an optical disk drive. The hard disk drive 42 and external disk drive 46 are connected to the system bus 38 by a hard disk drive interface 40 and an external disk drive interface 44, respectively. The drives and their associated computer-readable media provide nonvolatile storage of computer readable instructions, data structures, program modules and other data for the computing environment 20. Although the exemplary environment described herein employs a hard disk and an external disk 48, it should be appreciated by those skilled in the art that other types of computer readable media which can store data that is accessible by a computer, such as magnetic cassettes, flash memory cards, random access memories, read only memories, and the like, may also be used in the exemplary operating environment.

A number of program modules may be stored on the hard disk, external disk 48, ROM 30 or RAM 24, including an operating system (not shown), one or more application programs 26, other program modules (not shown), and program data 28. One such application program may include the functionality as detailed below.

A user may enter commands and/or information, as discussed below, into the computing environment 20 through input devices such as mouse 56 and keyboard 58. Other input devices (not shown) may include a microphone (or other sensors), joystick, game pad, scanner, or the like. These and other input devices may be connected to the processing unit 32 through a serial port interface 54 that is coupled to the system bus 38, or may be collected by other interfaces, such as a parallel port interface 50, game port or a universal serial bus (USB). Further, information may be printed using printer 52. The printer 52, and other parallel input/output devices, may be connected to the processing unit 32 through parallel port interface 50. A monitor 36, or other type of display device, is also connected to the system bus 38 via an interface, such as a video input/output 34. In addition to the monitor 36, computing environment 20 may include other peripheral output devices (not shown), such as speakers or other audible output.

The computing environment 20 may communicate with other electronic devices such as remote computer 68. Remote computer 68 may be another computing environment such as a server, router, network PC, peer device, telephone (wired or wireless), personal digital assistant, television, or the like. Remote computer 68 may include many or all of the elements described above relative to the computing environment 20. In one embodiment, the remote computer 68 is a server coupled with a database of historical financial data for a plurality of companies. Herein, the phrase "coupled with" is defined to mean directly connected to or indirectly connected with through one or more intermediate components. Such intermediate components may include both hardware and software based components. Alternatively, or in addition, the remote computer may include accounting and/or financial software for maintaining a company's internal recording keeping.

Figure 1B:
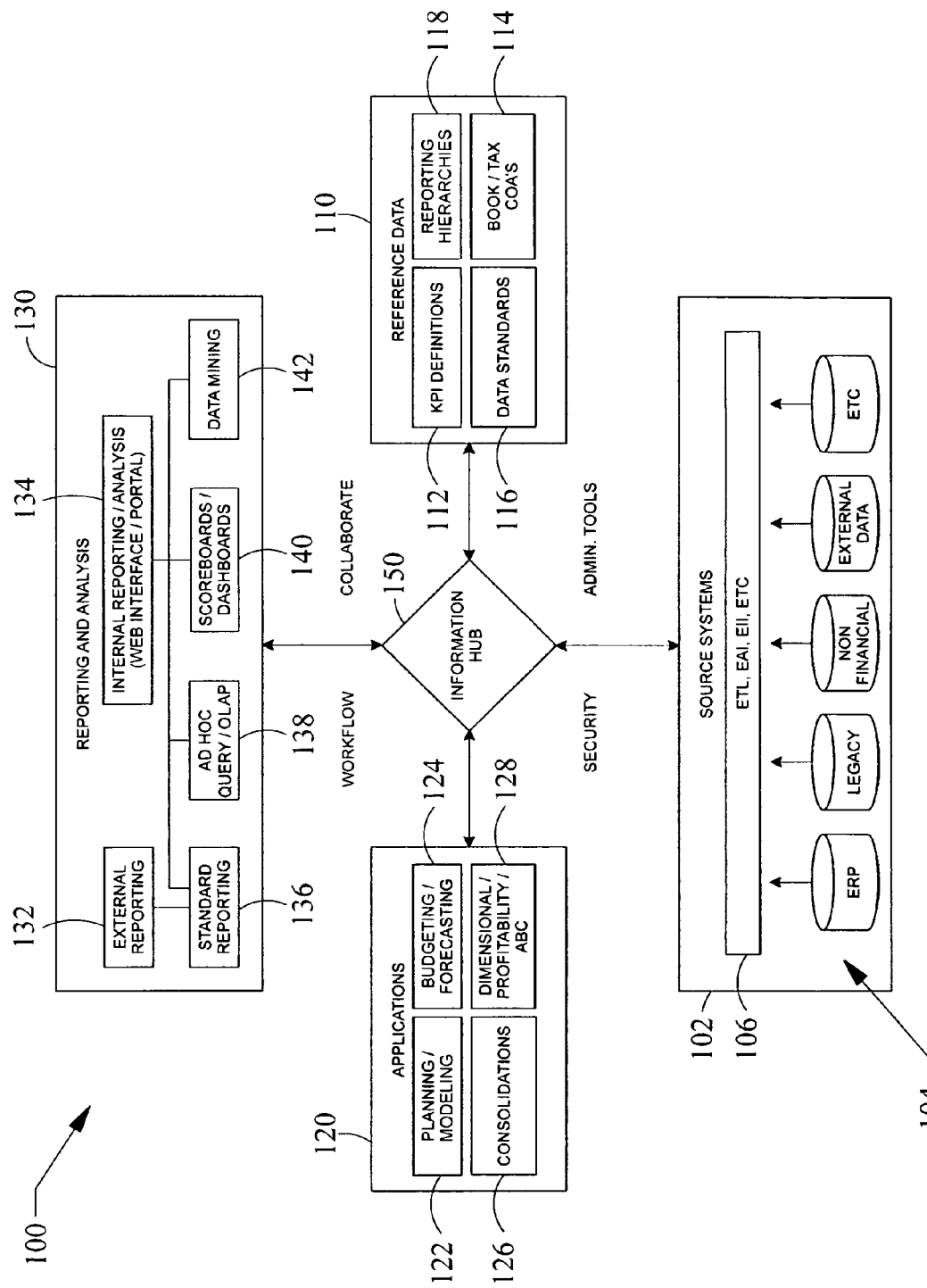
FIG. 1B is a diagram representative of an exemplary architecture for a BPM system.

To communicate, the computer environment 20 may operate in a networked environment using connections (wired, wireless or both wired and wireless) to one or more electronic devices. FIG. 1 depicts the computer environment networked with remote computer 68 and with information hub 150 of a distributed computer system for business performance management, as shown in FIG. 1B. The logical connections depicted in FIG. 1 include a local area network (LAN) 64 and a wide area network (WAN) 66. Such networking environments are commonplace in offices, enterprise-wide computer networks, intranets and the Internet.

When used in a LAN networking environment, the computing environment 20 may be connected to the LAN 64 through a network I/O 62. When used in a WAN networking environment, the computing environment 20 may include a modem 60 or other means for establishing communications over the WAN 66. The modem 60, which may be internal or external to computing environment 20, is connected to the system bus 38 via the serial port interface 54. In a networked environment, program modules depicted relative to the computing environment 20, or portions thereof, may be stored in a remote memory storage device resident on or accessible to remote computer 68. It will be appreciated that the network connections shown are exemplary and other means of establishing a communications link between the electronic devices may be used.

The new business performance management system and method is typically provided as software running on the processing unit 32, resident in the computer-readable medium of the storage device 42, to allow the processing unit 32 to provide the functionalities described herein. As described below, the software may be provided as a spreadsheet, for example as implemented on a spreadsheet program such as Microsoft Excel, however one skilled in the art would realize that the software may be provided as a stand-alone software program (i.e., implemented in any suitable programming language) operating on the processing unit 32 or any operating system provided therewith, and need not utilize any additional software operating on the system. Alternatively, or in addition, the functionalities may be provided as a combination of software and one or more ASICs to provide the functionalities discussed herein.

In further embodiments, as described below, the functionalities may also be provided as a web-based application running on a browser and accessible via the Internet or other communications network. Alternatively, the functionalities disclosed herein may be incorporated into an Executive Dashboard, described above. In yet another embodiment, the functionalities disclosed herein may be provided as a benchmarking service that analyzes historical data for a plurality of companies. The historical data may reside in a remote database, or may be internal to the benchmarking service. The benchmarking service may provide industry specific data and comparative benchmarks for particular industries, or provide general benchmarks that span multiple industries. In one embodiment, the functionalities are embedded into the architecture of a BPM management system via an information hub 150.

An exemplary BPM architecture 100 is shown in FIG. 1B. The architecture 100 may include various source systems 102, reference data 110, applications 120, and reporting and analysis tools 130 integrated by an information hub 150 that may provide support for collaboration of business units, workflow process management, security, and system administration. The source systems 100 may capture information about the company from various data sources 104 via various methods 106. Exemplary data sources 104 may include Enterprise Resource Planning systems (ERP), which are integrated information system that uses packaged software to serve any or all departments within an enterprise. For example, ERP systems may provide software for manufacturing, order entry, accounts receivable and payable, general ledger, purchasing, warehousing, transportation and human resources departments. Additional exemplary data sources 104 may include legacy systems as well as non-financial and external sources of data, and the like. Exemplary methods 104 for managing data from the data sources 104 may include Extraction, Transformation and Loading (ETL), which may be used copy data between databases of different types, Enterprise Application Integration (EAI), which may be used to integrate applications within the company, Enterprise Intelligence Integration (EII, also known as Enterprise Information Integration), which may aggregate disparate sources 104 of business information into a single analyzable body of information, and the like.

The architecture 100 may also include reference data 110 that may define various definitions, standards, and the like. For example, the company may reference certain KPI definitions 112, reporting hierarchies 114, data standards 116, and code of authorities 118. Applications 120 may also be included to provide strategic analysis in areas such as planning/modeling 122, budgeting/forecasting 124, consolidations 126, and dimensional profitability/ABC 128. Finally, reporting and analysis tools 130 may also be provided to present the analytical results to business managers via useful reports, visualizations, and the like. Traditional BPM systems may provide, for example, reporting tools for external reporting 132, internal reporting 134, and standard reporting 136. Additionally, or alternatively, tools may be provided for ad hoc database querying 138, such as OnLine Analytical Processing (OLAP) software that allows the user to quickly analyze information that has been summarized into multidimensional views and hierarchies, executive scoreboards or dashboards 140, data mining tools 142, and the like. It should be apparent to one of ordinary skill in the art, that the source systems 100, reference data 110, applications 120, reporting and analysis tools 140, and information hub 150 capabilities necessary for a particular company may be implementation dependent, and that exact combination of tools provided may vary greatly without departing from the spirit and scope of the present invention.

Figure 2:
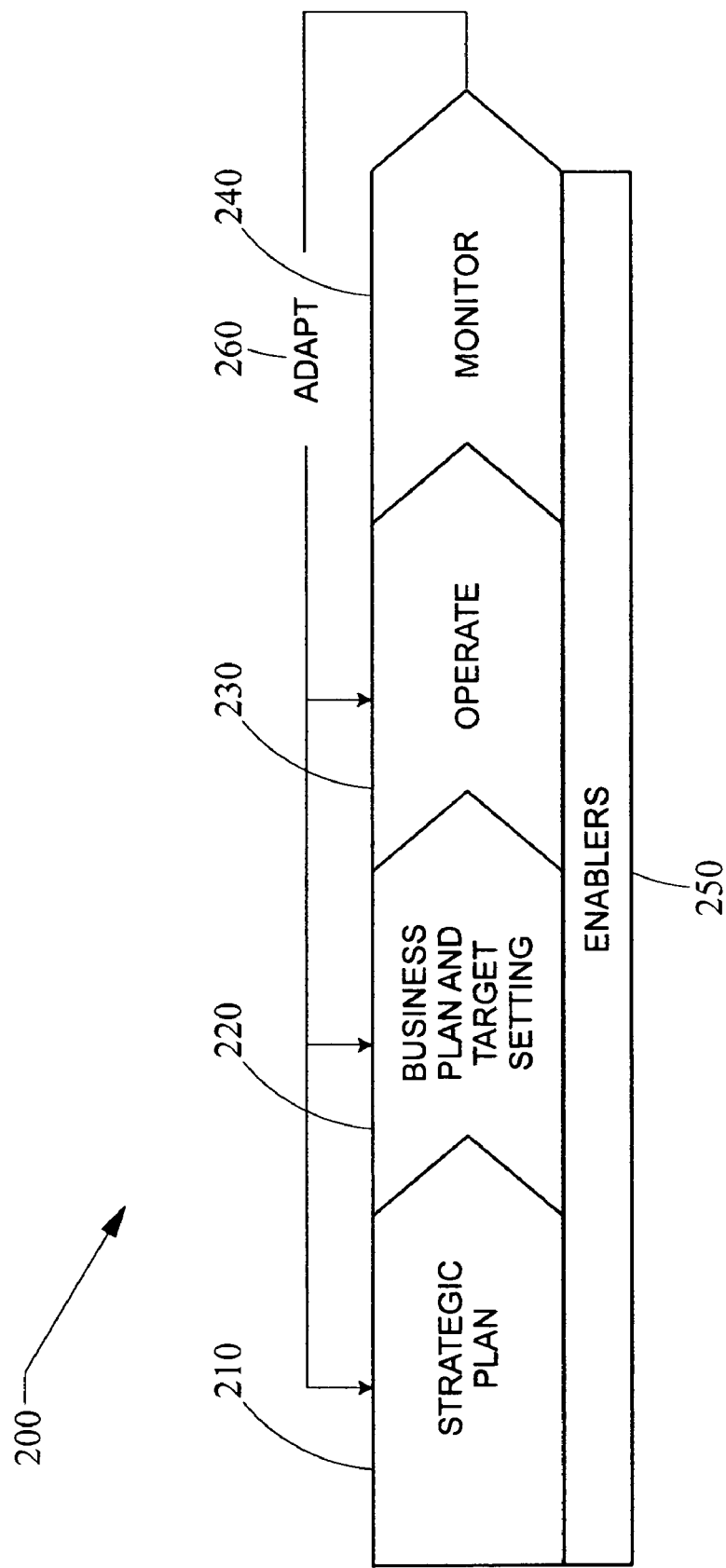
FIG. 2 is a diagram representative of an exemplary EPM technical architecture for implementing one embodiment.

Referring to FIG. 2, an exemplary framework 200 for delivering an integrated BPM system is shown. The framework 200 defines a process to drive strategy through to execution, with results informing periodic adjustments to both long and short term business tactics. The framework includes strategic planning 210, creating a business plan and target setting 220, managing operations 230, monitoring results 240, and enablers 250. The framework 200 also allows each of these areas to adapt 260 as results indicate. Exemplary strategic planning 210 tasks include environmental assessment, competitor assessment, analysis of business opportunities and key capabilities, and long-range financial planning. Exemplary tasks associated with business planning and targeted setting 220 include establishing a direction for products and services, determining the required capabilities, key initiatives, and determining revenue, cost and capital projections as well as budget and operational targets. Exemplary operational 230 tasks include setting operational targets, and managing initiatives, revenues, costs and capital. Exemplary monitoring 240 tasks include analyzing the prior period, forecasting, operational analysis, and dimensional analysis. Exemplary enablers 250 include employee incentives and rewards, and company policies and procedures.

Figure 3:
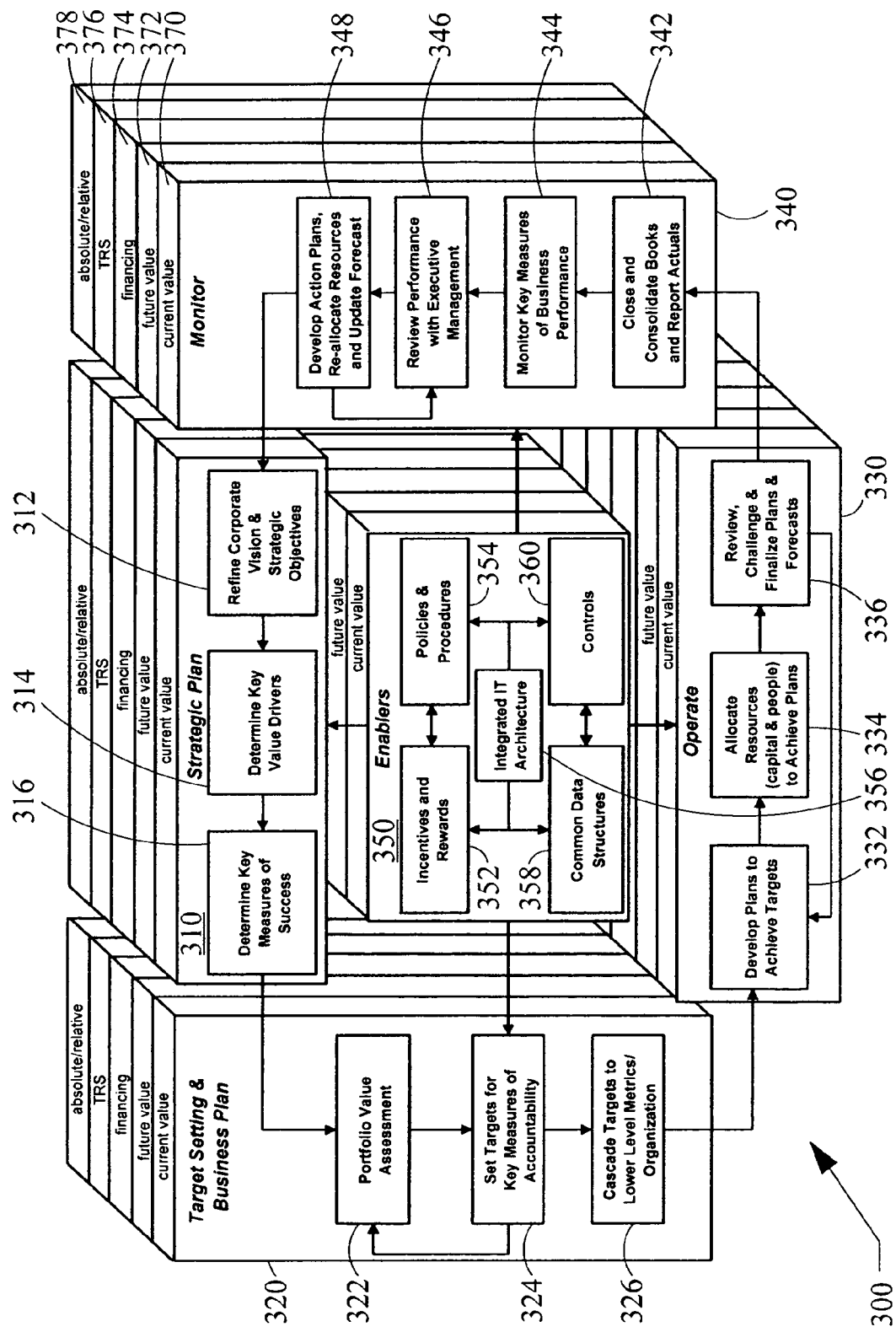
FIG. 3 is a diagram representative of an exemplary framework for delivering an integrated BPM system.

Referring to FIG. 3, an exemplary methodology for implementing the BPM framework of FIG. 2 is shown. As described above, current methodologies focus exclusively on internal performance metrics and current year performance. When utilizing the functionality described below, however, the framework 300 provides a holistic approach to BPM that allows a company to manage business performance across various aspects of its operations and at different levels. For example, a company may want to manage the performance of their business as it effects the company's current value 370, future value 372, financing 374 or TRS value 376, described in more detail below. Alternatively or additionally, the company may wish to see its performance across any of these areas in absolute or relative terms 378, such as raw number analysis, market indices or peer group assessments, respectively. The framework 300 represents the continuous process of strategic planning 310, target setting and business plan development 320, operating 330, and monitoring performance 340 as supported by various enablers 350. An exemplary methodology for strategic planning 310 includes refining corporate vision and strategic objectives 312, determining key value drivers 314, and determining key measures of success 316 activities. The functionalities disclosed herein may find particular use in the strategic planning 310 phase when refining the corporate vision and strategic objectives 312, for example, when analyzing investor expectations, key competitor information and current and future business performance. Similarly, the functionalities disclosed herein may be used to determine the key value drivers 314, for example, by providing a mapping of the value drivers to various performance metrics, and for determining the key measures of success 316, for example, by aligning those measures with shareholder value creation to create cause and effect maps.

An exemplary methodology for target setting and business plan development 320 includes portfolio value assessment 322, set targets for key measures of accountability 324, and cascade targets to lower level metrics/organization 326 activities. As described in more detail below, the functionalities disclosed herein may find particular use in setting targets for key measures of accountability 324, for example, by aligning top down targets with shareholder expectations and ensuring the consistency of external and internal targets. Similarly, the functionalities disclosed herein are ideally suited to cascade the targets to lower level metrics 326.

Exemplary methodology activities for operations 330 include developing plans to achieve the specified targets 332, allocating resources (in terms of both capital and man-power) to achieve all business plans 334, and reviewing, challenging, and finalizing plans and forecasts 336. The functionalities disclosed herein facilitate each of these activities 332, 334, and 336 by providing a clear mapping of target values to business and operational drivers to enable bottom-up resource allocation in line with the established target values.

An exemplary methodology for monitoring performance 340 includes activities for closing and consolidating books and reporting actuals 342, monitoring key measures of business performance 344, reviewing performance with executive management 346, and developing action plans, re-allocating resources and updating forecasts. The functionalities disclosed herein facilitate performance monitoring 340 by providing a consistent system for measuring the performance of the company and a simple user interface to determine exceptions and root causes of poor performance. Coupling these functionalities with a balanced scorecard or executive dashboard, as mentioned above, further enhance these advantages.

Finally, exemplary methodology activities for enablers 350 include establishing, analyzing, and adapting employee incentive and rewards programs 352 and policies and procedures 354, and providing an integrated IT architecture 356, such as the architecture describe above in reference to FIG. 1B, or other software solution projects that utilizes an effective set of common data structures 358 and controls 360.

In order to overcome the disadvantages of the prior art BPM systems, the financial performance metrics used to analyze a company's business performance should take an external view of the company's current and future value. One such external performance metric is the Total Return to Shareholders (TRS), and is defined as the company's equity plus any dividends paid on the stock. TRS can be calculated for a given shareholder by adding dividends to any stock price appreciation and dividing the resultant value by the shareholder's original investment. Coupling the external metric TRS with internal metrics of performance allows the company to see exactly what drives shareholder value.

Figure 4A:
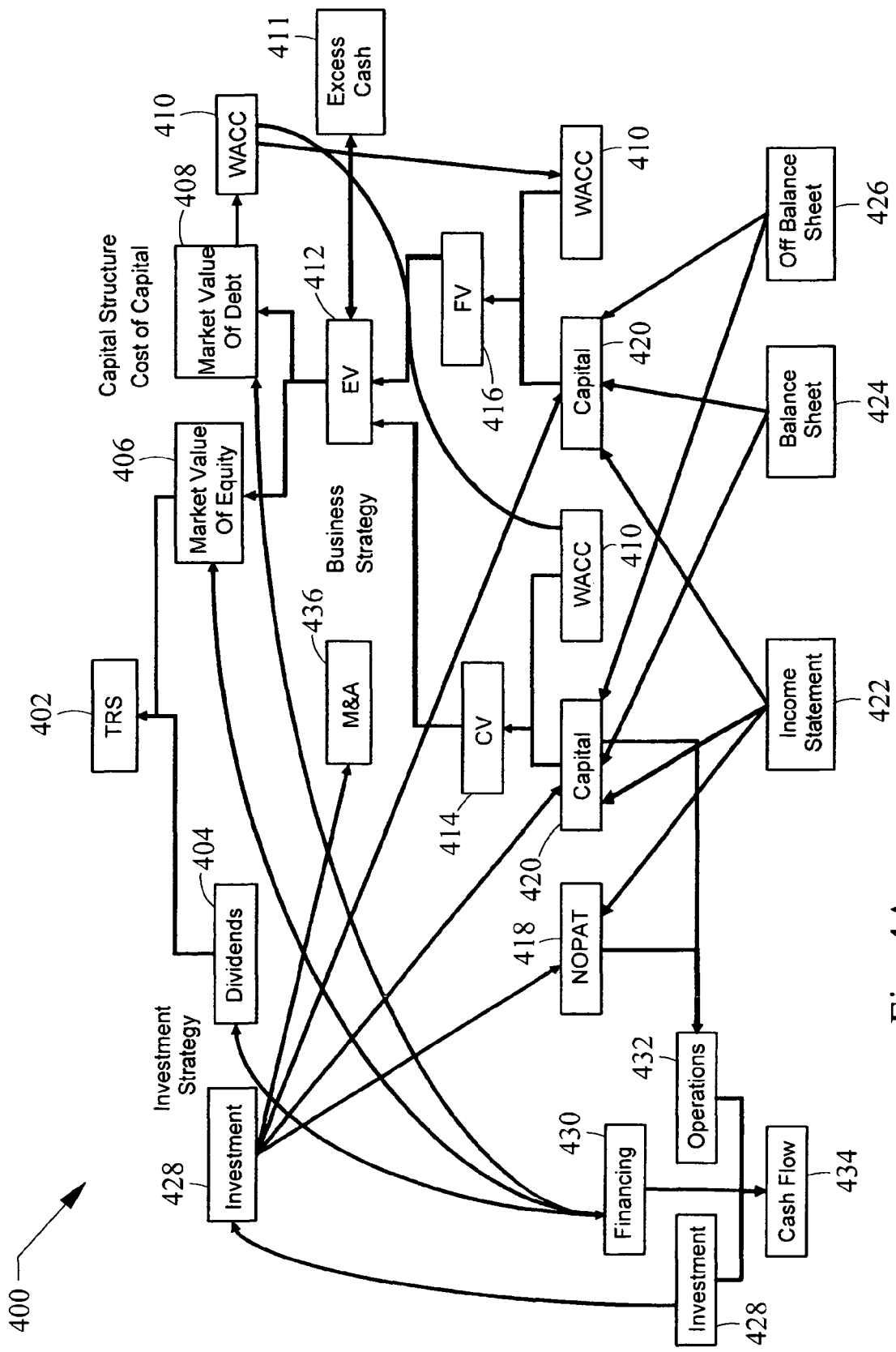
FIG. 4A is a diagram representative of one embodiment of a Total Return to Shareholder (TRS) map depicting exemplary interrelations between internal and external business metrics.

FIG. 4A shows an exemplary flowchart detailing the coupling of TRS with internal performance metrics and the interrelationships therein, also known as a TRS map 400. As described above, TRS 402 includes dividends 404 paid on the stock as well as the company's market value of equity or MVE 406. MVE 406 can be calculated by shares outstanding times share price. A company's debt 408 to equity structure influences its Weighted Average Cost of Capital 410 (WACC). The total market value of the company (MV) may be defined as the MVE 406 plus the market value of the debt 408.

Enterprise Value (EV) 412 (EV=MV less excess cash, 411) can be decomposed into Current Value 414 (CV) and Future Value 416 (FV). The CV 414 represents the current value of the company. The CV 414 is influenced by the company's Net Operating Profits Less Adjusted Taxes 418 (NOPLAT), capital 420, and WACC 410, and can be calculated by dividing the NOPLAT 418 by the WACC 410 (which is also equal to Capital 420+EP/WACC 410), such that CV 414=NOPLAT 418/WACC 410=Capital 420+EP/WACC 410. The FV 416 represents the future value of the company, or the difference between the EV 412 and the CV 414. The FV 416 is influenced by capital 420 and the WACC 410, and can be calculated by subtracting the CV 414 from the EV 412, such that FV=EV−CV. As further detail in FIG. 4A, the capital 420 includes both balance sheet 424 and off-balance sheet 426 components. Additionally, income 422 may influence capital 420 as well as the NOPLAT 418.

The data underpinning these performance metrics also have an effect on the cash flow 434 of the company. Cash flow 434 is determined by the investments 428 made in the company, any financing arrangements 430, as well as operations 432 results. The operations 432 results are influenced by the NOPLAT 418 and the capital 420. Financing arrangements 430 influence the equity 406 of the company, its debt 408, and the ability of the company to pay dividends 404. This may affect the decision of investors to make an investment 428 in the company, which may affect the NOPLAT 418, capital 420 and Mergers and Acquistions 436 (M & A) of the company.

Figure 4B:
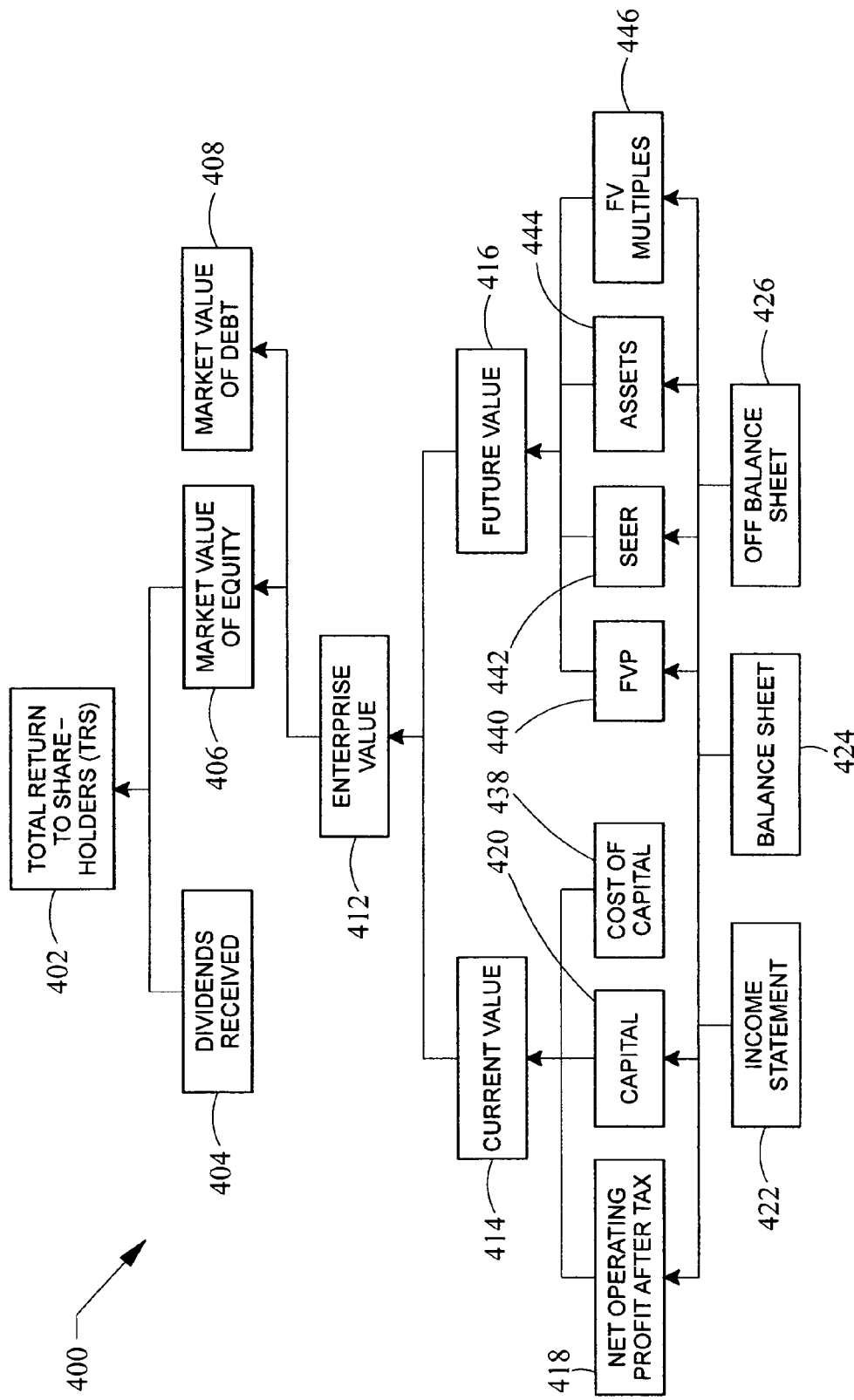
FIG. 4B is a diagram representative of a second embodiment of a TRS map depicting exemplary interrelations between internal and external business metrics.

FIG. 4B depicts an alternative embodiment of the TRS map 400. In the embodiment of FIG. 4B, the FV 416 may be further broken down into component parts via a variety of methods, each of which attempt to define the true drivers of FV 416. For example, one may use an FV premium 440 methodology to determine a company's FV 416 growth relative to the growth of the economy (segment or index) generally. In one embodiment, the FV premium methodology 440 may decompose the FV 416 value into three components: a first component that represents an operating advantage/disadvantage for the company; a second component that defines a projected rate of growth for the economy in general; and a third component that defines the remainder of FV 416 in the company.

In the FV premium methodology 440, the first component may represent an operating advantage/disadvantage for the company. This component may define whether the company is creating or destroying value in the current period, and may be calculated, for example, by calculating a company's economic profit (EP) capitalized (EP/WACC). As described in more detail below, EP may be calculated as a company's NOPLAT less a capital charge for the company, where the capital charge may be defined as a company's invested capital times a WACC for the company, such that EP=NOPLAT−(Invested Capital*WACC). If this value is negative, the company is operating at a disadvantage and is destroying the value of capital entrusted to the company. If this value is positive, the company is operating at an advantage and has generated a premium over the value of capital that is embedded in the company's CV 414. This first component thus defines the portion of FV 416 explained by investor's expected improvement to breakeven EP.

The second component of the FV premium methodology 440 may define an implied growth of the economy in general.

It should be apparent to one of ordinary skill in the art that this component may also define an implied growth rate for a particular market, market segment, industry, peer group, and the like. Additionally, this component may be determined using a variety of methods, each of which may be dependent on the market, market segment, etc. being analyzed. In one embodiment, the second component may represent an implied growth in the economy as determined by a terminal value calculation based on the US Gross Domestic Product (GDP). Typically, the terminal value of a perpetually growing firm may be defined as the Free Cash Flow of a company for the next period divided by WACC minus a terminal growth rate, or $FCF_{1+1}/(WACC-g)$. By substituting a breakeven NOPLAT value, or the point at which zero EP is being generated, for the Free Cash Flow of the company ($FTF_{1+1}$) and the historical growth rate of the US GDP for the terminal growth rate (g), one can determine that portion of a company's FV 416 implied by the growth rate of the economy. In one embodiment, the breakeven NOPLAT may be defined as a company's invested capital times WACC, such that the portion of a company's FV 416 attributable to the implied growth of the economy may be calculated by the following equation: (Invested Capital*WACC)/(WACC-g). An exemplary growth rate for the US GDP is 3.41%, adjusted for inflation.

The third component, or the FV premium component, of the FV premium methodology 440 includes the remainder of any FV 416 not explained by the first two components, or the FV 416 of the company minus that portion of FV 416 explained by the implied growth of economy minus any FV 416 explained by an operating disadvantage. For companies operating at an advantage, the FV premium component may be defined as the FV 416 of the company minus that portion of FV 416 explained by the implied growth of economy. A positive FV premium component indicates that the company is outperforming the economy, market sector, industry, or the like, while a negative FV premium component indicates a growth rate below what is to be expected.

Alternatively, or additionally, other methodologies may be used to further analyze the FV 416 of a company. In one embodiment, a SEER™ methodology 442 provided by Asset Economics, Inc. of New York, N.Y. is used to define the drivers of FV 416. The SEER™ methodology is a sophisticated holistic methodology that breaks down stakeholder value perceptions into measurable attributes, such as user growth, customer satisfaction, current system capacity, innovativeness, potential user size, and the like. Next, these attributes may be linked to the resources controlled by company management. Exemplary resources include monetary, physical, relational, organizational or human resources. In one embodiment, the SEER™ methodology may provide a framework that offers comparable consideration to all resource forms, regardless of their type.

Figure 7:
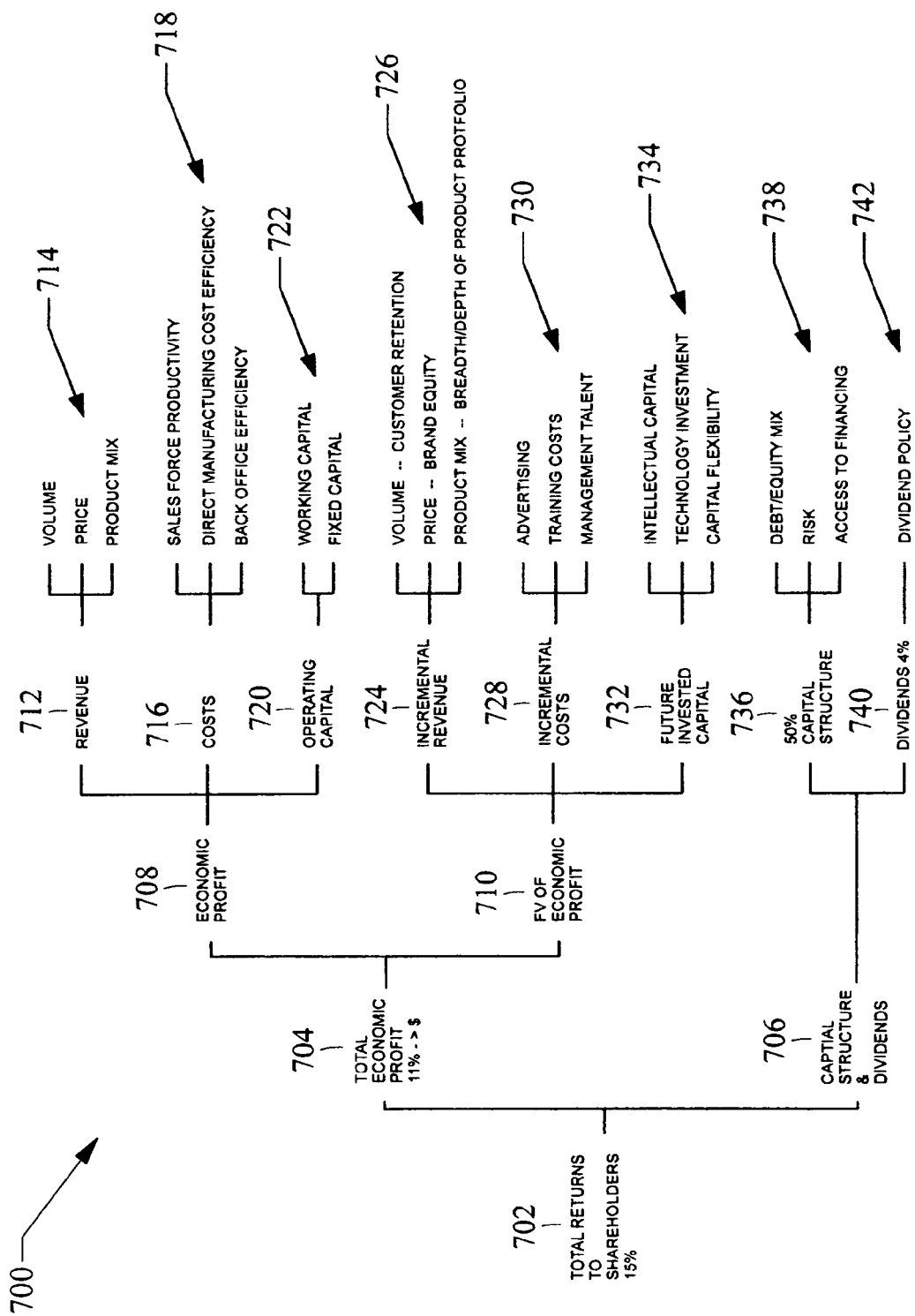
FIG. 7 is an exemplary hierarchical representation of company assets that drive the Future Value (FV) of a company.

In another embodiment, an asset methodology 444 is used to break down FV 416 by each company asset that drives FV 416. Referring to FIG. 7, a hierarchical relationship 700 of exemplary assets that drive various performance metrics described above, including FV 416, is shown. The hierarchy begins with TRS 702, which includes TEP 704 and Capital Structure and Debt 706 components. The TEP 704 component includes both an EP 708 sub-component and a FV of EP 710 sub-component to accurately reflect both the current and future value of the company. The EP sub-component is driven by revenue 712, costs 716, and operating capital 720 sub-components. Exemplary revenue drivers 714 include revenue volume, price and product mix components. Exemplary cost drivers 718 include sales force productivity, direct manufacturing cost efficiency and back office efficiency. Exemplary operating capital drivers 722 include working capital and fixed capital.

Similarly, the FV of EP 710 sub-component is driven by incremental revenue 724, incremental costs 728, and future invested capital 732 sub-components. Exemplary incremental revenue drivers 726 include volume, price, product mix, customer retention, brand equity and the breadth/depth of the company's product portfolio. Exemplary incremental costs drivers 730 include advertising, training costs, and management talent considerations. Exemplary future invested capital drivers 734 include intellectual capital, technology investments, and capital flexibility.

The capital structure and dividends 706 component includes capital structure 736 and dividends 740 components. Exemplary capital structure drivers 738 include debt/equity mix, risk, and access to financing considerations. Finally, dividends are driven by the dividend policy 742.

In one embodiment, target values are set for the TRS 702, TEP 704, Capital Structure 736, and dividend 740 components of the hierarchy. Based on these values, the company can see exactly which value drivers of the company's business are affected. In one embodiment, the hierarchy is provided as a static document. Alternatively, the hierarchy 700 may be provided as a dynamic model that uses a top-down approach to calculate target values for each of the drivers according to the specified target values. In another embodiment, the hierarchy 700 may be provided as a dynamic model that receives input values for each of the drivers and generates the TRS 702, TEP 704, EP 708 and FV of EP 710 values in accordance with the inputs. The hierarchy 700 may be further provided as an integrated solution and coupled with the company's financial and accounting systems to incorporate the most current data into the calculation of driver targets. The hierarchy 700 may alternatively, or in addition, be provided as an marketing tool for selling goods or services related to any of the value drivers in the hierarchy.

In still another embodiment, an FV multiples methodology 446 is used to analyze a company's investments in the drivers of FV 416 to suggest investment strategies that may maximize FV 416. In one embodiment, the FV multiples methodology includes capitalizing operational expenses for at least one business unit of the company to determine unique return on investment relationship between FV and the business unit (FV ROI). This ratio may be referred to as an FV multiple. In other words, the FV multiples methodology 446 may be used to determine whether the market is rewarding the company for investing in a particular business unit.

Figure 8:
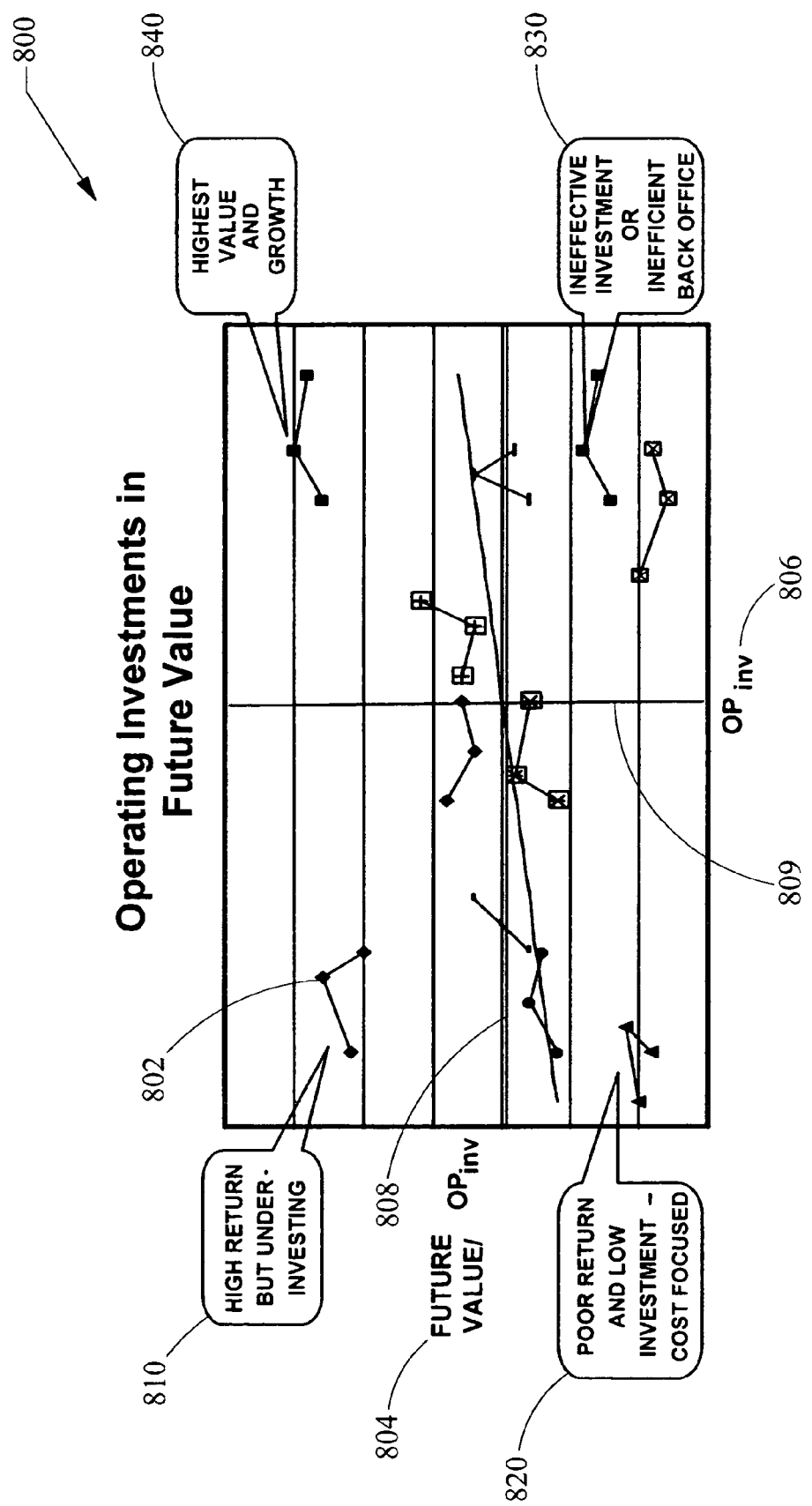
FIG. 8 is an exemplary graph of FV return on investment ratios.

Referring also to FIG. 8, an exemplary chart 800 for detailing the FV ROI for various business units of a company is shown. The chart 800 includes a plurality of data points 802 that represent the FV ROIC for a particular business unit. Data points 802 are representative of the total FV 416 of the company divided by operating investment in the business unit 804 (FV/OP$_{inv}$), as well as the total amount of the operating investment 806 (OP$_{inv}$). In the upper left quadrant 810 are data points 802 that indicate small investments that are earning a high FV ROI. Investments represented by these data points 802 are being rewarded by the market, and, in general, should be increased if possible. The bottom left quadrant 820 includes data points 802 that indicate small investments having a low FV ROI. These data points 802 are usually representative of cost focused operating investments. The bottom right quadrant 830 includes large investments that are providing a poor FV ROI. Investments represented by these data points 802 may indicate ineffective investments or an inefficient back office. Finally, the upper right quadrant 840 includes data points 802 indicative of large investments that are providing a positive FV ROI. These investments represent the ideal investments of the company in its FV 416.

By establishing benchmark values 808 and 809 for FV/OP$_{inv}$ 804 and OP$_{inv}$ 806, respectively, the chart 800 may be divided into four quadrants 810, 820, 830, and 840 that allow a user to quickly and easily determine the effectiveness of the operating investments. Benchmark FIGS. 808 and 809 may be set to any value. For example, the FV/OP$_{inv}$ benchmark 808 may be set to zero.

Historical FV ROI information, such as additional data points 802, may also be included in the chart 800. In the embodiment of FIG. 8, each set of data points 802 represents three years of FV ROI information for a particular business unit of the company.

Additionally the FV multiples, or the FV ROI ratios, may be used to determine investment strategies in either the CV 414 or FV 416 of the company. As described above, the EV 412 of the company comprises the CV 414 and FV 416 of the company. Accordingly, one may increase the EV 412 of the company by increasing either the CV 414 or the FV 416. The FV multiples may be used to determine whether an investment should be made in either the CV 414 or FV 416.

In one example for determining where a company should invest resources to increase the total return to shareholders, assume company X has $1.00 which it can either take as profit (investment in CV 414) or reinvest into a business unit with an FV multiple of 15. Further assuming a tax rate of 40% and a WACC of 10%. Taking the $1.00 as profit, the company must pay $0.40 in taxes, leaving a net income of $0.60, which may be capitalized to a CV 414 increase of $6.00. If the company was to reinvest the money into the business unit, the company would immediately realize a 40% tax-credit, which may be capitalized to $4.00. Additionally, the company would realize a $15.00 ($1.00×15) return on investment, for a total increase in FV 416 of $19.00. Using these principles, company executives can determine the optimum balance of CV 414 and FV 416 to increase the EV 412 of the company.

In additional embodiments, the various methodologies may be combined to provide more sophisticated analysis of the FV 416. For example, the asset methodology 444 and the FV multiples methodology 446 can be combined to form a hierarchical representation of operating investments in FV 416. For example, the hierarchical representation may include an FV 416 component that includes various operating investment components. The operating investment components, in turn, may include associated values and FV multiples, or FV ROIs. The hierarchical representation may then be provided showing FV, the operating investment components, and the associated values. A user may enter values for each of the operating investment component, and the hierarchical representation may automatically calculate the FV based on the operating investment values. It should be apparent to one of ordinary skill in the art that other combinations of methodologies for analyzing the FV 416 of a company are also contemplated herein.

Figure 4C:
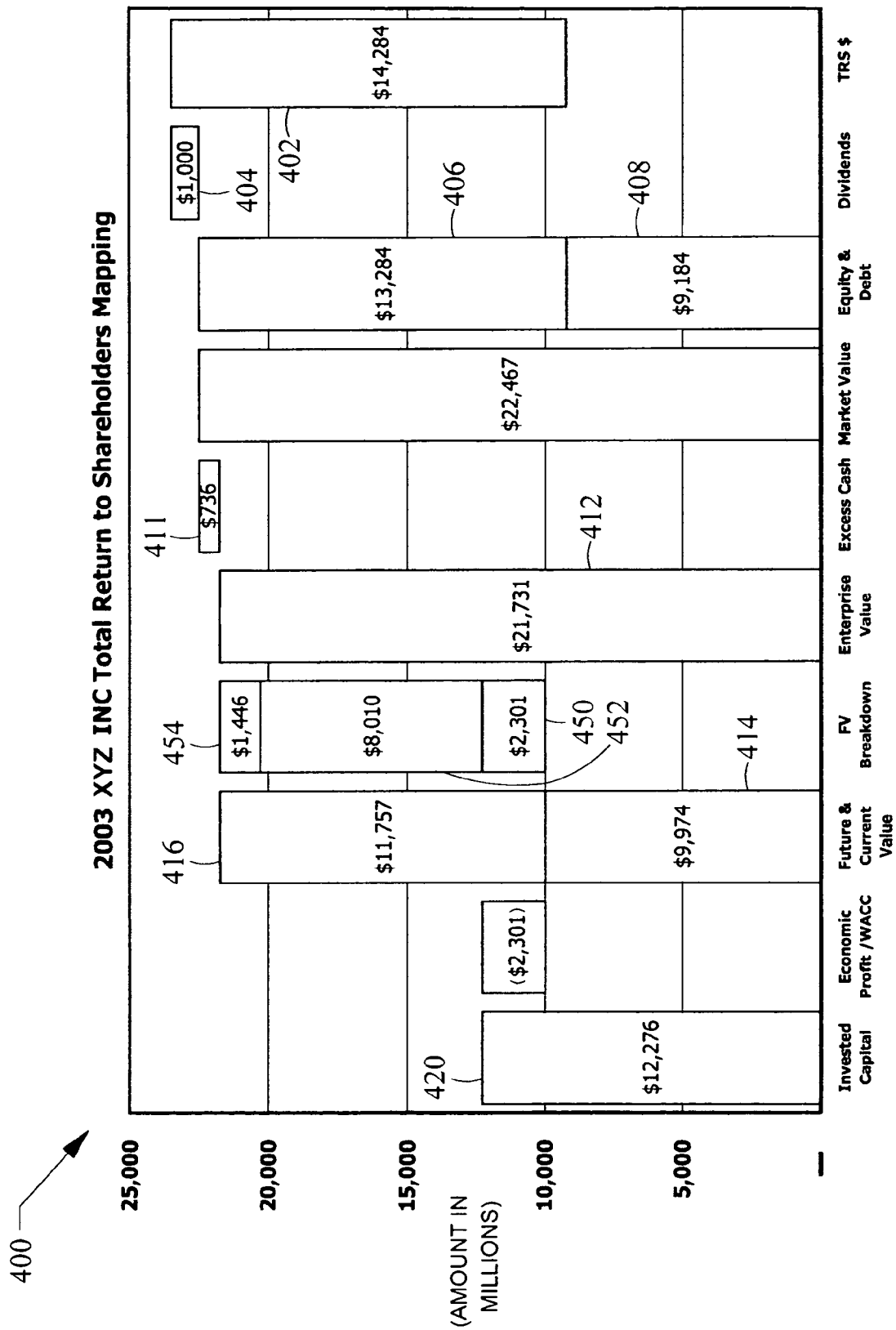
FIG. 4C is a diagram representative of a third embodiment of a TRS map depicting exemplary interrelations between internal and external business metrics.

Referring now to FIG. 4C, an exemplary visualization for displaying a TRS map 400 is shown. In the embodiment of FIG. 4C, a bar graph is used to visually convey the various components of a TRS map 400 to a user, and may be used to explain the TRS 402 for a particular period of time. For example, assume a company had a TRS 402 of $14,284 for a given period while paying $1000 in dividends 404 over that same period, resulting in a market value of equity 406 equal to $13,284. Further assuming a market value of debt 408 for the company of $9,184, the total market value of the company may be calculated at $22,467. Subtracting any excess cash 411 for the period leaves an enterprise value 412 of $21,731. If the company has an invested capital 420 of $12,276 and EP/WACC of ($2301), it can be calculated that the company's equity value 412 includes $9,974 of CV 414 and $11,757 of FV 416. Using the FV premium methodology 440, one can determine that the various components of FV 416 include a first portion 450 of $2,301 based on the expectation that the company will reach a breakeven economic profit, a second portion 452 of $8,010 based on an expected growth of the economy generally, and a third portion 454 of $1,446 which represents an expectation that the growth of the company will exceed that of the economy.

In FIGS. 5A-B an exemplary TRS statement detailing a Total Economic Profit (TEP) 510 calculation is shown. TEP represents one metric for annualizing and managing current and future value that bridges the gap between internal performance metrics and external metrics such as TRS. The TEP 510 of a company may be defined to include economic profit portions attributable to the current year, future value, capital charges, financing, and the like, or any combination thereof. The TEP 510 may be calculated for a given year, such as for tracking historical performance 520 of a company, or may be calculated for the enterprise as a whole. Additionally, change percentages 522 for the TEP may also be calculated. In one embodiment, the TEP 510 may also be used for target setting 530, described in more detail below with reference to FIGS. 5A and 5B, and in another embodiment with reference FIG. 9.

In the embodiment of FIGS. 5A-B, the TEP 510 is calculated by adding an EP 502 component, an invested capital charge 504, an EP of FV component 504, and an EP of financing component 504. The EP 502 component defines economic profit for the current value of the company for the given period, and may be calculated by multiplying the invested capital 540 of a company by its WACC 542 and subtracting the resultant value from company's NOPLAT 544. The invested capital charge 504 may be calculated by multiplying the company's invested capital 540 by the company's WACC 542. The Economic Profit of Future Value (EP of FV) 506 represents the economic profit of future value component 510 and may be calculated by multiplying the FV 546 of the company by its WACC 542. Optionally, the EP of finance 508 represents the portion of EP attributable to the company's financing arrangements. In one embodiment, the EP of finance 508 may be calculated by multiplying the dividends 548 paid for the period by the total number of outstanding shares 550 and dividing the resultant value by the company's WACC 542, such that the EP of finance 508= (Dividends per Share*Outstanding Shares)*WACC/WACC. Finally, the TEP 510 is calculated by adding the EP of CV 502, the capital charge 504, the EP of FV 506, and the EP of finance 510, so that the a capitalized change in TEP for a given period is equal to the TRS for that period.

The TEP can then be used to calculate the TRS for a given year. The TRS change for a given period can be calculated in dollars by calculating the change in TEP for the period (TEP at the end of the period minus TEP at the beginning of the period) and dividing the result by the WACC. Next, any change in debt is subtracted from the resultant value, and finally the dividends are added, such that the TEP ($)= (TEP2−TEP1)/WACC−Change in Debt+Dividends.

These calculations may also be represented as follows:

$$TRS\$ = MV2 - MV1 + \text{Dividends} \quad \text{(Eq. 1)}$$

$$TRS\ \% = (MV2 - MV1 + \text{Dividends})/MV1 * 100 \quad \text{(Eq. 2)}$$

Where $MV2$ is the market value of equity at the end of the period,
$MV1$ is the market value of equity at the beginning of the period and dividends are issued during the period.

$$EP = NOPLAT - (\text{Capital} * WACC) \quad \text{(Eq. 3)}$$
$$= EP \text{ of } CV$$

$$CV = NOPLAT/WACC \quad \text{(Eq. 4)}$$
$$= \text{Capital} + EP/WACC$$

$$MV = \text{Equity} + \text{Debt} \quad \text{(Eq. 5)}$$
$$= EV + \text{excess cash}$$
$$= cv + fv + \text{excess cash}$$

$$EV = \text{equity} + \text{Debt} - \text{excess cash} \quad \text{(Eq. 6)}$$
$$= mv - \text{excess cash}$$

$$FV = EV - CV \quad \text{(Eq. 7)}$$
$$= \text{Equity} + \text{Debt} - EP/WACC - \text{capital} - \text{excess cash}$$
$$= \text{Equity} + \text{Debt} - NOPLAT/WACC - \text{excess cash}$$

$$EP \text{ of } FV = FV * WACC \text{ (Decapitalizing Future Value)} \quad \text{(Eq. 8)}$$

$$TEP = \quad \text{(Eq. 9)}$$
$$\text{Capital} * Wacc + EP \text{ of } CV + EP \text{ of } FV + EP \text{ of Financing}$$

$$TRS = (TEP2/WACC2 - TEP1/WACC1) - 1 \quad \text{(Eq. 10)}$$

Using annual TRS calculations allows a company to set target TRS values and decompose the TRS target (or shareholder expected returns) into values for Operating Capital and performance (CV), Growth (FV), and Financing. These additional values can then be further broken down, as described below. Indexing can be used to show performance in absolute and relative terms.

The Total Return to Shareholder (TRS) Statement 500, as depicted in FIGS. 5A and 5B, is useful as a displayed component of a software tool for analyzing a company's past performance in comparison with a target shareholder return, and for setting future performance goals to achieve future shareholder targets. As between an earlier first time period (e.g., Year 2002) and a later second time period 9 e.g., Year 2003), historical financial data 520 for the two time periods may be downloaded and received into the software tool for generating and displaying the TRS Statement 500. From this historical data, a shareholder return may be calculated in accordance with the equations above. The software tool may receive target input variables including NOPLAT Growth rate and target shareholder return. These target input variables may be applied to the historical data for the earlier first time period to calculate with the data processor executing the software containing the TRS equations a set of predicted financial data for the second time period. The historical financial data of the second period may be compared with the predicted financial data to determine a variance between the two. By analyzing the sources of the variance, the under or over achievements of different business components of the company may be revealed. Thus, investments in those business components may be adjusted to optimize the capital invested to obtain the predicted target return to shareholders in future periods. The calculated returns may be adjusted for overall market growth or growth in a portion of the market relevant to the company by inputting an appropriate index, such as GDP, into the software tool. Other target variables may be input into the software tool to accommodate additional manipulations to the target setting analysis, such as target WACC and Dividends to allow adjustments in corporate financing to be reflected in the predicted shareholder returns.

An exemplary TRS target worksheet using the TEP metric is shown in FIG. 6. Although the exemplary TRS worksheet of FIG. 6 contemplates TRS target setting, it should be apparent to one of ordinary skill in the art that a similar worksheet could be used to track historical performance of a company's TRS as well. Initially, a desired growth rate 602, dividend payment percentage 604, and debt/equity ratio 606 are established. In the example of FIG. 6, the company desires a ten percent growth rate 602, a five percent dividend payment 604, and a debt/equity ratio 606 of forty percent. Target TRS percentage changes 610 are then established for each of the desired year based on the growth percentage 602. Next, the TRS percentage changes 610 are converted to TRS dollar amount changes 612 for each year. The dividend targets 614 are calculated based on the desired dividend rate 604. Finally, the equity 616 and debt 618 values are calculated as a function of the desired debt/equity ratio 606. As the cost of equity (ke) is embedded in the WACC, setting a TRS target=ke assures meeting investor expectations i.e. equity growth at ke.

From these values, the equations described above can be used to establish target values for additional performance metrics. These include targets for EV 620, EP of CV 622, FV 624, EP 626, EP of FV 628, and TEP 630. Finally, the annual TRS dollar change 632 can be calculated as a function of the TEP targets 630 to verify the calculations. These targets can then be decomposed further into targets for the drivers of each of these metrics to help the company reach these targets.

Figure 9:
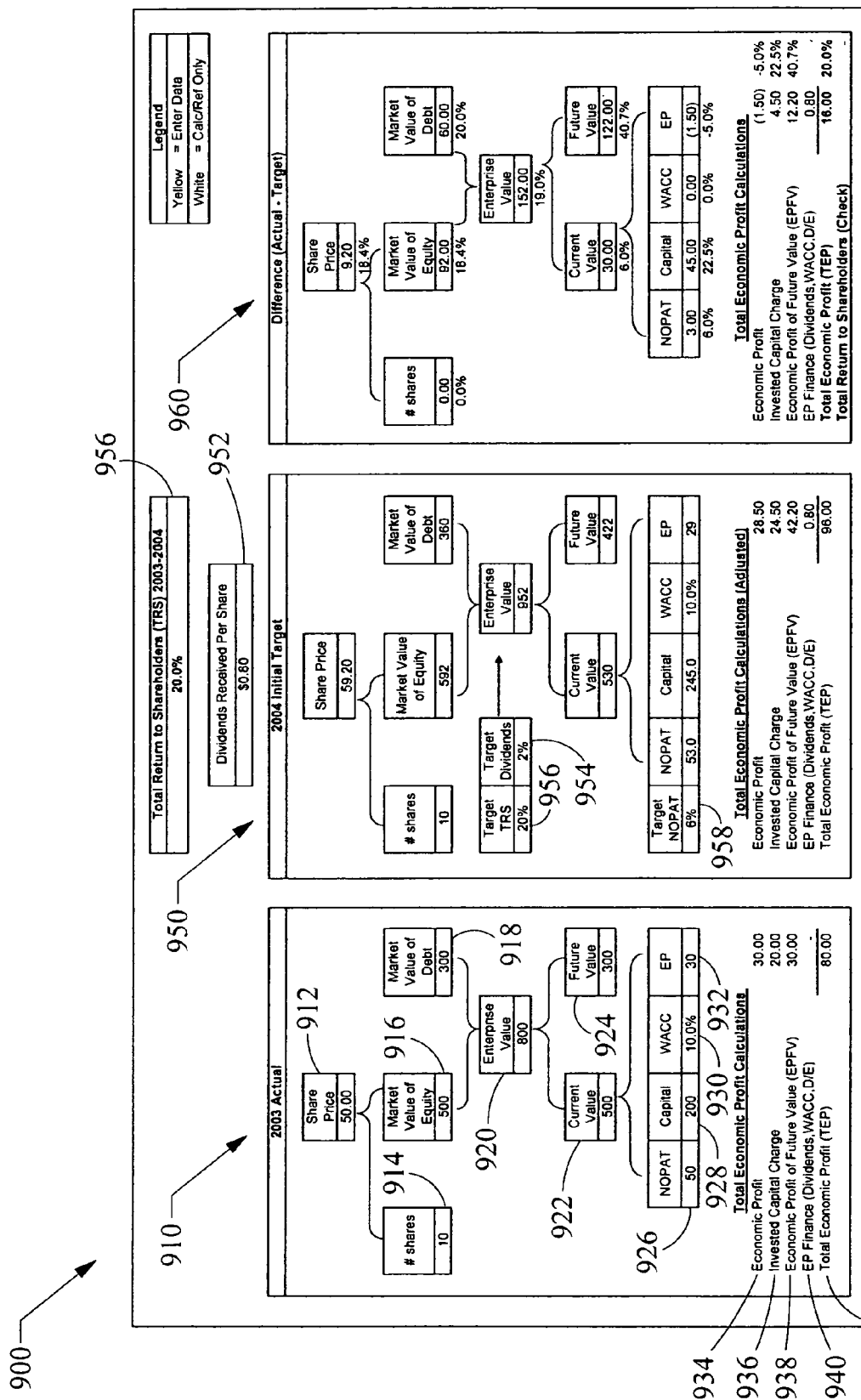
FIG. 9 illustrates a TRS target setting displayed template for use in planning predicted shareholder return and earnings growth.

In another embodiment, the invention may include a software tool displaying a template to assist a user in planning the TRS targets for a company. As shown in FIG. 9, a software tool may generate and display a TRS Target Setting template 900 that includes three areas mapping the TRS financial performance metrics. A first area 910 of the template displays financial performance measures for a past time period, for example year end 2003, as shown. These financial performance measures include share price 912, number of shares 914, market value of equity 916, market value of debt 918, enterprise value 920, current value 922, future value 924, NOPLAT (or NOPAT as shown) 926, Capital 928, WACC 930 and Economic Profit 932. The template positions these financial performance measures in the same hierarchy or stratum as in the TRS Map shown in FIGS. 4A and 4B. On the template, the following financial performance measures may be configured as numerical input fields to allow the software tool to receive the measures from direct user input: number of shares 914, market value of equity 916, market value of debt 918, NOPAT 926, Capital 928, WACC 930 and EP 932. Alternatively, the measures may be uploaded from other data stores or memory locations where the data was previously input by others. The values EV 920, CV 922 and FV 924 are calculated based on the values input into the above fields in accordance with the equations noted above. For simplicity, this embodiment is illustrated with excess cash assumed to be zero.

A second area 950 of the template 900 displays predicted financial performance measures for a future time period, for example year end 2004, as shown. The same financial performance measures displayed in the first area 900 for the first time period are displayed in the second area 950 for the second time period. In contrast to the first area, these financial performance measures in the second area are calculated based on the values from the first period and three additional data inputs for the second period: the dividends per share 952 (or alternatively a dividend rate 954), a Target TRS growth 956 and a Target NOPAT growth 958. This data may be input by a user into active numerical entry fields in the template or uploaded or received from other data sources.

From these few input targets, the predicted financial performance measures making up the components of shareholder return may be calculated and displayed in the second area 950. Second period NOPAT is calculated as the first period NOPAT*Target NOPAT growth. The second period capital is calculated as first period capital+second period NOPAT−(Dividends*No. Shares). The second period Economic profit (EP) is calculated as second period NOPAT−(second period Capital*WACC). The second period Current Value (CV) is calculated as second period NOPAT/WACC. The predicted EV for the second time period is calculated as the first period EV*Target TRS−(Dividend*Number of Shares). The second period Future Value (FV) is calculated as second period EV−second period CV. The second period Market Value of Debt is calculated as first period Market Value of Debt*Target TRS. The second period market Value of Equity is calculated as second period EV−second period Market Value of Debt. The share price is calculated as second period Market of Equity divided by Number of Shares.

A third area 960 of the template 900 displays the change in the financial performance measures displayed in the first time period to the second time period. The change is displayed in both absolute terms and in percentage terms. These measures are calculated based on the difference of the values from the first and second time periods.

Below the TRS Mapped financial components of each area 910, 950 and 960, the components of the Total Economic Profit (TEP) Calculation are displayed. Here, TEP 942 is the sum of the Economic Profit (EP) 934, Invested Capital Charge 936, Economic Profit of Future Value (EP of FV) 938 and EP of Finance 940. The differences of the TEP calculation from the first period to the second period are displayed in the third area 960. As a verification of the validity of the data entry, the change in TEP should be confirmed to be equal to the target TRS.

With few data inputs the template allows a user to set targets for TRS and NOPAT growth and to immediately view the effect on the predicted TRS components in the second time period. As shown in FIG. 9, setting a 20% return to shareholders and a 6% growth in NOPAT, the EP decreases 5%, Capital increases 22.5% and EP of FV increases 40.7%. Thus, the higher shareholder returns at the lower earnings growth must be achieved through dramatic increases in future value of the company. This target setting planning can assist a user in determining where the future growth must be achieved to attain the targeted growth and returns. From that analysis, a user can then examine the future value drivers in the company, as shown in FIG. 7, and plan where to invest capital to achieve the growth in predicted future value to support the targeted shareholder returns.

As noted above, the decomposition and mapping of the current and future value components of the total return to shareholders along with associated business processes or business components that drive those values provides valuable software tools for use in analyzing business performance and in managing the operation of those business components. As used herein, a business component may be an organizational sub-division of a company or enterprise. A business component also may be a business process within an enterprise that may be analyzed as an independent operation from a financial perspective.

In one embodiment, for example, a software tool may be provided on a laptop computer for use by a business consultant. In person-to-person interviews with a client, financial data may be input into a computer having a spreadsheet programmed to perform the calculations noted above. The spreadsheet may execute the calculations and presently generate reports on the display of the laptop for review by the consultant and client. The decomposition of shareholder value into component parts may displayed in graphical hierarchical maps that provide powerful depictions of hypothetical scenarios of the effect that drivers of business components have on current and future enterprise values.

In another embodiment, the program executing the calculations may be resident on computer-readable medium in a server in communication with a privately accessible data communication network, such as the internet or a WAN. The program may be accessed through a computer having a browser based interface to implement the same scenario identified above, or scenarios identified below.

Using the above spreadsheet or similarly programmed software tool implementing the method of this invention, one may quickly identify business component values that under perform industry benchmarks or corporate targets. The identified components may be candidates for further analysis to determine whether technology solutions may be provided to raise performance standards and enhance shareholder value. The spreadsheet or other software tool may include a library of standard technology solutions associated with each business component. Such solutions may be displayed or included in a report generated that describes the identified underperforming component and solutions that require further analysis for implementation to achieve benchmark or other target performance.

In yet another embodiment, the invention may be implemented in an enterprise as part of the business management software. A computer in communication with the financial accounting system may import financial data representative of the performance of a plurality of business components. The financial data may be manipulated to correspond with business components according to a map of business components identified as driving current or future value of shareholder returns. The financial data may then be analyzed in accordance with this invention to determine and display the expected actual shareholder return driven by the actual performance. Such data may be graphically displayed in a hierarchical map, or in the form of an executive dashboard. The actual performance financial data may be displayed along side with target values for various business component values. Colors, such as green, yellow, or red, for example, may be used to identify the relative performance, such as above, below, or greatly below target values assigned to individual business components. Additionally, acceptable tolerances for each business component target value may be established and reflected in the display. Such tools may be useful when integrated as monitoring tools into the business performance management frameworks, such as described in association with FIGS. 2 and 3.

In still another embodiment, the invention may be implemented in the form of a financial data provider. A database containing a historical store of financial data of corporation may be in communication on a publicly accessible network. For a fee, financial analysts may access such data and, using the software tools with on their own systems or on a server dedicated to this database, the financial analysts may map the components of shareholder value across broad swaths of industry segments. Also, the financial analysts may focus on a specific industry to determine industry benchmarks of component values. Those component benchmarks may be applied to generate financial report maps used for comparison purposes in making investment decisions with a specific company. Alternatively, the benchmarks may be used for comparison to identify which business components within a company are underperforming competitors, to enable business mangers to determine which business components require additional resources to maintain competitive performance levels.

In an alternative embodiment, the invention may be implemented in the form of target setting, forecasting, and budgeting tools in which targets are selected at a high level of management through a process of strategic planning to select targets based on a combination of value, such as TRS value for example, expected to be added and manageability of the candidate targets. In one embodiment, computer simulations of, inter alia, increased cash flows expected by the target strategies. These targets may then be flowed down to the various levels of management, budgets may be constructed around those target strategies, and the budgets may be consolidated and flowed upward. Alternatively, or additionally, the system may be used to increase shareholder value by improving forecasting abilities through the use of graphical representations of performance metrics of similarly situated companies in order to identify realistic value enhancing business strategies as goals for the organization. Exemplary systems of these types include those described in U.S. Patent Publication Nos. 2004/0073441 A1 and 2004/0073477 A1, both to Heyns et al., the entire disclosures of which are hereby incorporated by reference.

In still another embodiment, the invention may be implemented in a system for automatically examining a company's financial data and evaluating factors affecting the company's stock value. The system may, for example, evaluate a company's spread through that company's debt and equity costs and measure returns to investors from company growth, which may be either organic growth or growth through mergers and acquisitions. The system may also evaluate the financial data of other publicly traded companies, such as those in the same industry, and compares the various factors affecting stock value. The system may also include tools for determining the return to investors, such as a software-based application that collects receives financial data and uses this information to calculate the return to inventor through the company's spreads and growth. An exemplary systems of these types include those described in U.S. Patent Publication Nos. 2005/0004832 A1, to Ostergard et al., the entire disclosure of which is hereby incorporated by reference.

Based on the teachings described herein, others of ordinary skill in the art will appreciate other applications of the system, apparatus and methods in accordance with this invention. Accordingly, it is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method that analyzes financial performance measures of a company, the method comprising:

generating, by instructions stored in a computer-readable memory and executed by a processor coupled to the memory, a display on a computer user interface input device a template with three template areas, a first template area containing historical financial data for a first time period, a second template area containing predicted financial data for the second time period, and a third template area containing financial performance measurement changes from the first time period to the second time period, where the first period precedes the second time period, and where each of the time periods displaying financial performance measures comprising: NOPAT, Capital, Weighted Average Cost of Capital (WACC), a company's Economic Profit (EP), Current Value (CV), Future Value (FV), Enterprise Value (EV), Market Value of Equity, Market Value of Debt, number of company shares, and share price;

receiving through the input device at the first template area or by memory upload into the first template area, using instructions stored in a computer-readable memory and executed by a processor coupled to the memory, historical financial data of a company for at least a first time period, where the values for the first time period for the historical financial data comprise NOPAT, Capital, WACC, EP, Market Value of Equity, Market Value of Debt, and either a number of company shares or share price, Enterprise Value, the Current Value and the Future Value, wherein the Enterprise Value is the Market Value of Equity plus the Market Value of Debt, the Current Value is the NOPAT divided by the WACC, and the Future Value is the Enterprise Value minus the Current Value;

receiving through the input device at the second template area or by memory upload into the second template area, using the instructions executed by the processor, target input variables for targeted changes from the first time period to the second time period, the target input variables comprising: target Net Operating Profit After Tax (NOPAT) growth; target Total Return to Shareholders (TRS), and target dividends per share;

calculating, by the instructions executed by the processor, the predicted financial data for the second period based on the target input variables applied to the historical financial data for the first period and displaying the results in the second template area;

calculating, by the instructions executed by the processor, the financial performance measurement changes from the first period to the second period and displaying the results in the third template area;

calculating, by the instructions executed by the processor, a percentage change in Total Economic Profit (TEP) from the first time period to the second time period and displaying the results in the third template area;

comparing, by the instructions executed by the processor, a percentage change in target Total Return to Shareholders (TRS) displayed in the second template area to the percentage change in Total Economic Profit (TEP) from the first time period to the second time period displayed in the third template area;

adjusting recursively, by the instructions executed by the processor, at least one of the target input variables for a future time period until a percentage change in target Total Return to Shareholders (TRS) displayed in the second template area is equal to a user selectable target Total Return to Shareholders (TRS) value.

2. The computer-implemented method of claim 1, further comprising adjusting the target total Return to Shareholders based on the determined performance variance by establishing, using the instructions executed by the processor, components of TEP including incremental revenue drivers, future invested capital drivers and incremental cost drivers of company operations based on the determined performance variance, wherein the incremental revenue drivers include volume, price, product mix, customer retention, brand equity and the breadth/depth of the company's product portfolio, wherein the incremental cost drivers include advertising, training costs, and management talent considerations, and wherein the future invested capital drivers include intellectual capital, technology investments, and capital flexibility.

3. The computer-implemented method of claim 2, further comprising analyzing, using the instructions executed by the processor, the performance variance that determines the company operational drivers causing the performance variance and obtaining a target total return to shareholders by adjusting future investment related to the determined operational drivers.

4. The computer-implemented method of claim 1, wherein for each of the first and second time periods calculating, using the instructions executed by the processor, a Total Economic Profit (TEP) for the period according to the equation:

$$TEP = \text{Economic Profit} + \text{Invested Capital Charge} + \text{Economic Profit of Future Value (EPFV)} + \text{Total Dividends Paid};$$

wherein

Economic Profit=NOPAT−Capital*Weighted Average Cost of Capital (WACC),

Invested Capital Charge=Capital*WACC,

EPFV=Future Value (FV)*WACC; and

FV=Market Value of Equity+Market Value of Debt−(NOPAT/WACC).

5. The computer-implemented method of claim 4, further comprising adjusting, using the instructions executed by the processor, the Target Total Return to Shareholders with an index value that is the growth rate of at least a portion of the economy.

6. The computer-implemented method of claim 1, wherein for the second time period the predicted financial data of Enterprise Value is calculated by the equation: second period EV=(first period EV*Target TRS)−(target Dividend Per Share*Number of Shares).

7. The computer-implemented method of claim 1, wherein for the second time period the predicted financial data of Share Price is calculated by the equation: second period Share Price=second period EV−(first period Market Value of Debt*Target TRS).

8. The computer-implemented method of claim 1, wherein for the second time period the predicted financial data are calculated by the equations:

$$\text{second period NOPAT} = (\text{first period NOPAT} * \text{Target NOPAT Growth}); \qquad (a)$$

$$\text{second period Capital} = \text{first period capital} + \text{second period NOPAT} - (\text{target Dividends Per Share} * \text{Number of Shares}); \text{ and} \qquad (b)$$

$$\text{second period Economic Profit} = \text{second period NOPAT} - \text{second period Capital} * \text{WACC}) \qquad (c).$$

9. The computer-implemented method of claim 8, wherein for the second time period the predicted financial data are calculated by the equations: (a) second period Enterprise Value (EV)=(first period EV*Target TRS)−(target Dividend Per Share*Number of Shares); (b) second period Current Value (CV)=(second period NOPAT/WACC); and (c) second period Future Value=second period EV−second period CV.

* * * * *